(12) United States Patent
Kakishima et al.

(10) Patent No.: US 11,723,058 B2
(45) Date of Patent: Aug. 8, 2023

(54) METHOD OF FREQUENCY RESOURCE ALLOCATION

(71) Applicant: NTT DOCOMO, INC., Tokyo (JP)

(72) Inventors: Yuichi Kakishima, Tokyo (JP); Chongning Na, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 79 days.

(21) Appl. No.: 16/622,709

(22) PCT Filed: Jun. 14, 2018

(86) PCT No.: PCT/US2018/037600
§ 371 (c)(1),
(2) Date: Dec. 13, 2019

(87) PCT Pub. No.: WO2018/232157
PCT Pub. Date: Dec. 20, 2018

(65) Prior Publication Data
US 2020/0120683 A1    Apr. 16, 2020

Related U.S. Application Data

(60) Provisional application No. 62/519,708, filed on Jun. 14, 2017.

(51) Int. Cl.
*H04W 72/08* (2009.01)
*H04W 72/542* (2023.01)
(Continued)

(52) U.S. Cl.
CPC ........ *H04W 72/542* (2023.01); *H04B 17/336* (2015.01); *H04L 1/0026* (2013.01);
(Continued)

(58) Field of Classification Search
CPC ............. H04W 72/085; H04W 72/082; H04W 72/0453
See application file for complete search history.

(56) References Cited

U.S. PATENT DOCUMENTS

2013/0182594 A1* 7/2013 Kim ...................... H04L 5/0037
                                                                  370/252
2013/0242902 A1   9/2013 Liu et al.
(Continued)

FOREIGN PATENT DOCUMENTS

EP    2779493 A1    9/2014
EP    2817893 A1    12/2014
(Continued)

OTHER PUBLICATIONS

International Search Report issued in PCT/US2018/037600 dated Sep. 13, 2018 (3 pages).
(Continued)

*Primary Examiner* — Zhiren Qin
(74) *Attorney, Agent, or Firm* — Osha Bergman Watanabe & Burton LLP

(57) ABSTRACT

A method of frequency resource allocation for Channel State Information Reference Signal (CSI-RS) in a wireless communication system includes transmitting, from a base station (BS) to a user equipment (UE), a CSI-RS using a CSI-RS resource, calculating, with the UE, CSI based on the CSI-RS, and reporting, from the UE to the BS, the CSI. The CSI-RS resource in a frequency domain is allocated to one or more frequency resources that are part of a carrier bandwidth. The method further includes notifying, with the BS, the UE of a location of the one or more frequency resources in the frequency domain.

5 Claims, 22 Drawing Sheets

(51) Int. Cl.
  *H04B 17/336* (2015.01)
  *H04L 1/00* (2006.01)
  *H04L 5/00* (2006.01)
  *H04L 25/02* (2006.01)
  *H04W 24/10* (2009.01)
  *H04W 72/0453* (2023.01)
  *H04W 72/541* (2023.01)

(52) U.S. Cl.
  CPC ........ *H04L 5/0051* (2013.01); *H04L 25/0226* (2013.01); *H04W 24/10* (2013.01); *H04W 72/0453* (2013.01); *H04W 72/541* (2023.01)

(56) References Cited

U.S. PATENT DOCUMENTS

| | | | | |
|---|---|---|---|---|
| 2014/0241191 | A1* | 8/2014 | Yu | H04L 5/0092 |
| | | | | 370/252 |
| 2014/0286189 | A1* | 9/2014 | Kang | H04B 17/345 |
| | | | | 370/252 |
| 2015/0229452 | A1 | 8/2015 | Nagata et al. | |
| 2016/0212733 | A1* | 7/2016 | Davydov | H04L 5/0094 |
| 2016/0285569 | A1 | 9/2016 | Nagata et al. | |
| 2016/0330004 | A1* | 11/2016 | Kim | H04L 5/0048 |
| 2017/0245165 | A1* | 8/2017 | Onggosanusi | H04W 24/08 |
| 2018/0049169 | A1* | 2/2018 | Lin | H04W 72/23 |
| 2018/0091273 | A1* | 3/2018 | Choi | H04L 5/005 |
| 2018/0192409 | A1* | 7/2018 | Yang | H04W 72/044 |
| 2018/0262313 | A1* | 9/2018 | Nam | H04L 5/0044 |
| 2018/0262938 | A1* | 9/2018 | Liu | H04L 5/0057 |
| 2018/0359646 | A1* | 12/2018 | Tomeba | H04B 7/086 |
| 2019/0149290 | A1* | 5/2019 | Liu | H04L 1/0009 |
| | | | | 370/329 |
| 2020/0305038 | A1* | 9/2020 | Tooher | H04W 74/0833 |
| 2020/0322935 | A1 | 10/2020 | Kim et al. | |

FOREIGN PATENT DOCUMENTS

| | | |
|---|---|---|
| EP | 2843983 A1 | 3/2015 |
| EP | 2849513 A1 | 3/2015 |
| EP | 2903335 A1 | 8/2015 |
| EP | 3051904 A1 | 8/2016 |
| WO | 2017/027799 A1 | 2/2017 |

OTHER PUBLICATIONS

Written Opinion of the International Searching Authority issued in PCT/US2018/037600 dated Sep. 13, 2018 (5 pages).
3GPP TS 36.211 V14.2.0; "3rd Generation Partnership Project; Technical Specification Group Radio Access Network; Evolved Universal Terrestrial Radio Access (E-UTRA); Physical channels and modulation (Release 14)"; Mar. 2017 (194 pages).
3GPP TS 36.213 V14.2.0; "3rd Generation Partnership Project; Technical Specification Group Radio Access Network; Evolved Universal Terrestrial Radio Access (E-UTRA); Physical layer procedures (Release 14)"; Mar. 2017 (454 pages).
Office Action in counterpart Chinese Patent Application No. 201880039336.5 dated Jan. 4, 2022 (14 pages).
Office Action issued in the counterpart Chinese Patent Application No. 201880039336.5, dated Jun. 13, 2022 (10 pages).
Extended European Search Report issued in counterpart European Patent Application No. 22160177.6, dated Jun. 13, 2022 (9 pages).
Office Action issued in the counterpart Japanese Patent Application No. 2019-569319, dated Jun. 14, 2022 (6 pages).
Samsung; "Discussions on CSI-RS design for NR MIMO"; 3GPP TSG RAN WG1 Meeting #89, R1-1707970; Hangzhou, China; May 15-19, 2017 (9 pages).
ZTE; "On CSI framework details"; 3GPP TSG RAN WG1 Meeting #89, R1-1707123; Hangzhou, China; May 15-19, 2017 (12 pages).
Refusal Decision issued in Chinese Patent Application No. 201880039336.5 dated Sep. 28, 2022 (17 pages).
Decision of Refusal issued in Japanese Patent Application No. 2019-569319, dated Oct. 11, 2022 (6 pages).
Office Action issued in the counterpart Japanese Patent Application No. 2019-569319, dated Jan. 17, 2023 (9 pages).

* cited by examiner

METHOD OF FREQUENCY RESOURCE ALLOCATION

TECHNICAL FIELD

The present invention generally relates to a method of frequency resource allocation for a Channel State Information (CSI)-Reference Signal (RS), CSI-Interference Measurement, Zero Power CSI-RS, and other RSs in a wireless communication system.

BACKGROUND ART

In a CSI acquisition scheme under Long Term Evolution (LTE) Rel. 14 and new radio (NR), beamforming can be applied to CSI-Reference Signal (RS). The beamformed CSI-RS can reduce overheads of downlink signals and increase coverage of the CSI-RS by obtaining beamforming gain. Furthermore, effective channel estimation can be performed using the beamformed CSI-RS.

However, in the LTE Rel. 14, the NR, and the legacy LTE standard, a CSI-RS transmission scheme using frequency scheduling has not been determined.

CITATION LIST

Non-Patent Reference

[Non-Patent Reference 1] 3GPP, TS 36.211 V 14.2.0
[Non-Patent Reference 2] 3GPP, TS 36.213 V14.2.0

SUMMARY OF THE INVENTION

One or more embodiments of the present invention relate to a method for wireless communication that includes receiving, with a user equipment (UE), a Channel State Information Reference Signal (CSI-RS) allocated to partial frequency resources from a first base station (BS), and performing channel estimation based on the CSI-RS.

One or more embodiments of the present invention relate to a method of frequency resource allocation for CSI-RS in a wireless communication system that includes transmitting, from a BS to a UE, a CSI-RS using a CSI-RS resource, calculating, with the UE, CSI based on the CSI-RS, and reporting, from the UE to the BS, the CSI. The CSI-RS resource in a frequency domain is allocated to one or more frequency resources that are part of a carrier bandwidth.

One or more embodiments of the present invention relate to a method of frequency resource allocation for interference measurement in a wireless communication system that includes notifying, with a BS, a UE of one or more frequency resources used for interference measurement, and performing, with the UE, the interference measurement. The one or more frequency resources are part of a carrier bandwidth.

One or more embodiments of the present invention relate to a method of frequency resource allocation for ZP CSI-RS transmission in a wireless communication system that includes transmitting, from a BS to a UE, a ZP CSI-RS using a ZP CSI-RS resource, and performing, with the UE, interference measurement based on the ZP CSI-RS. The ZP CSI-RS resource in a frequency domain is allocated to one or more frequency resources that are part of a carrier bandwidth.

One or more embodiments of the present invention can provide a method to apply frequency scheduling to CSI-RS transmission. Furthermore, according to one or more embodiments of the present invention, channel estimation and interference estimation using precoding can be performed. Furthermore, according to one or more embodiments of the present invention, it is possible to estimate inter-user interference.

Other embodiments and advantages of the present invention will be recognized from the description and figures.

DETAILED DESCRIPTION OF EMBODIMENTS

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

In one or more embodiments of the present invention, examples of technologies for a CSI acquisition (estimation) scheme using CSI-RS and/or SRS will be described below; however, the technologies according to one or more embodiments of the present invention may apply to other beam management and CSI acquisition schemes using other resources such as Demodulation Reference Signal (DM-RS), etc.

Figure 1:
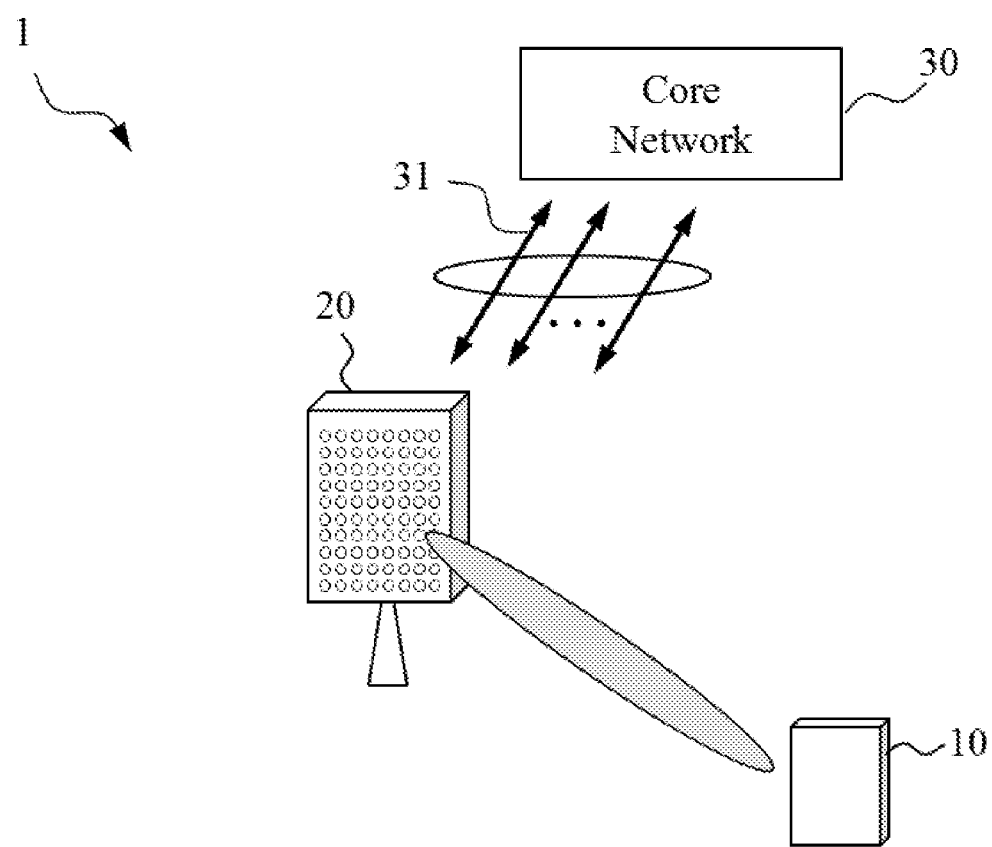
FIG. 1 is a diagram showing a configuration of a wireless communication system according to one or more embodiments of the present invention.

FIG. 1 is a wireless communications system 1 according to one or more embodiments of the present invention. The wireless communication system 1 includes a user equipment (UE) 10, a gNodeB (gNB) 20, and a core network 30. The wireless communication system 1 may be a New Radio (NR) system. The wireless communication system 1 is not limited to the specific configurations described herein and may be any type of wireless communication system such as an LTE/LTE-Advanced (LTE-A) system.

The gNB 20 may communicate uplink (UL) and downlink (DL) signals with the UE 10 in a cell of the gNB 20. The DL and UL signals may include control information and user data. The gNB 20 may communicate DL and UL signals with the core network 30 through backhaul links 31. The gNB 20 may be an example of a base station (BS). The gNB 20 may be referred to as a transmission and reception point (TRP). For example, when the wireless communications system 1 is a LTE system, the BS may be an evolved NodeB (eNB).

The gNB 20 includes antennas, a communication interface to communicate with an adjacent gNB 20 (for example, X2 interface), a communication interface to communicate with the core network 30 (for example, S1 interface), and a CPU (Central Processing Unit) such as a processor or a circuit to process transmitted and received signals with the UE 10. Operations of the gNB 20 may be implemented by the processor processing or executing data and programs stored in a memory. However, the gNB 20 is not limited to the hardware configuration set forth above and may be realized by other appropriate hardware configurations as understood by those of ordinary skill in the art. Numerous gNBs 20 may be disposed so as to cover a broader service area of the wireless communication system 1.

The UE 10 may communicate DL and UL signals that include control information and user data with the gNB 20 using Multi Input Multi Output (MIMO) technology. The UE 10 may be a mobile station, a smartphone, a cellular phone, a tablet, a mobile router, or information processing apparatus having a radio communication function such as a wearable device. The wireless communication system 1 may include one or more UEs 10.

The UE 10 includes a CPU such as a processor, a RAM (Random Access Memory), a flash memory, and a radio communication device to transmit/receive radio signals to/from the gNB 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

First Example

Figure 2A:
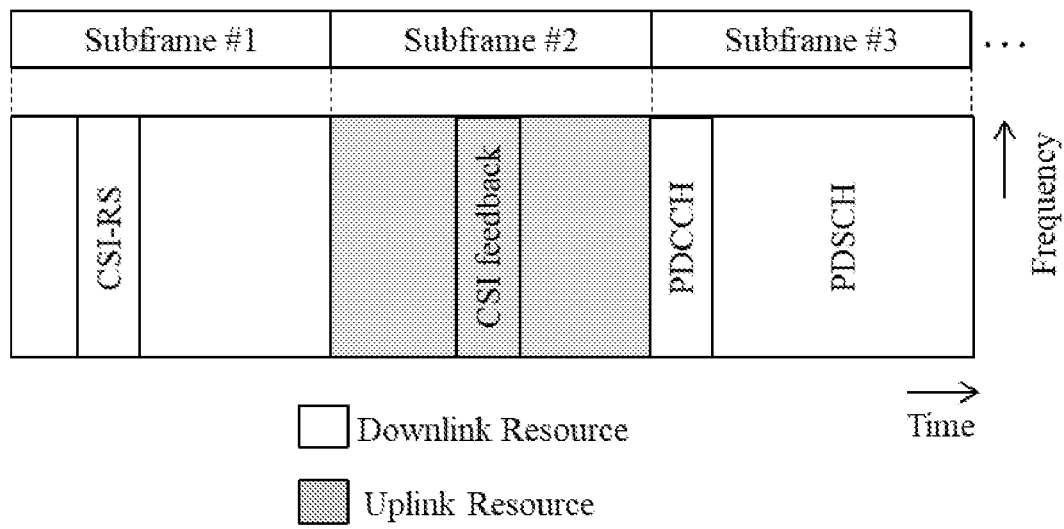
FIG. 2A is a diagram showing a resource allocation method in a conventional CSI acquisition scheme according to the legacy LTE standards.

FIG. 2A is a diagram showing a resource allocation in a conventional CSI acquisition scheme according to the legacy LTE standards. As shown in FIG. 2A, in the conventional CSI acquisition (estimation) scheme, a first subframe (subframe #1) (Transmission Time Interval (TTI)) includes a CSI-RS in a downlink resource, a second subframe (subframe #2) includes CSI feedback, and a third subframe (subframe #3) includes a Physical Downlink Control Channel (PDCCH) and a Physical Downlink Shared Channel (PDSCH). In FIG. 2A, all frequency resources (e.g., carrier bandwidth or system bandwidth) in a frequency domain are allocated to the CSI-RS in the conventional CSI acquisition scheme. In FIG. 2A, the same frequency resources are allocated to the CSI-RS, CSI feedback, the PDCCH, and the PDSCH.

Figure 2B:
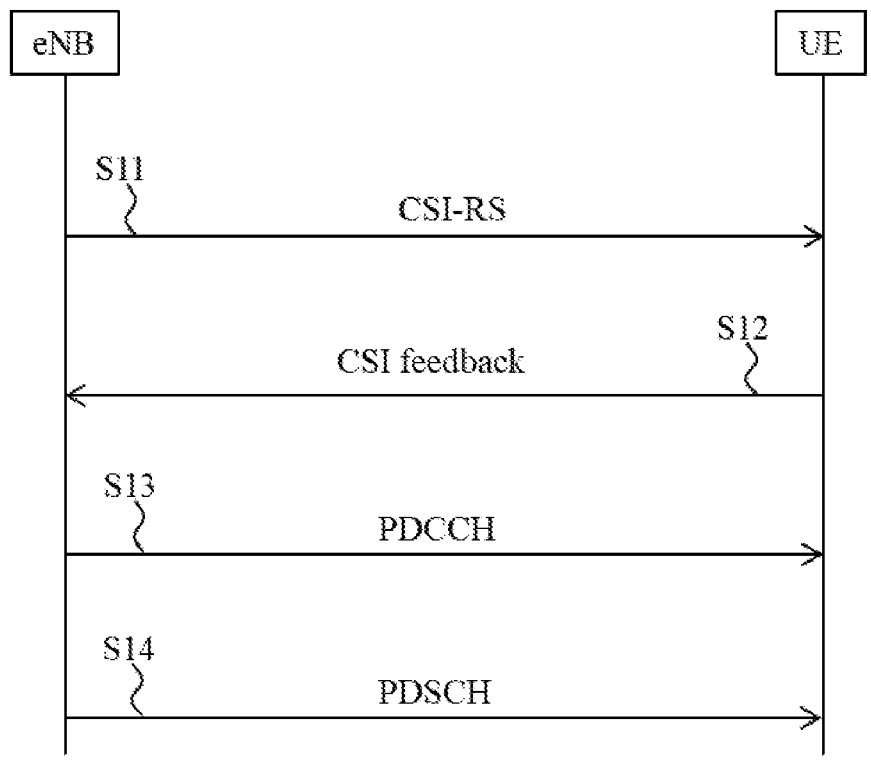
FIG. 2B is a sequence diagram showing an operation example of the conventional CSI acquisition scheme according to the legacy LTE standards.

FIG. 2B is a sequence diagram showing an operation example of the conventional CSI acquisition scheme according to the legacy LTE standards. As shown in FIG. 2B, at step S11, the eNB transmits the CSI-RS (using all frequency resources (e.g., carrier bandwidth or system bandwidth)) to the UE. At step S12, the UE transmits CSI feedback information based on the received CSI-RS, to the eNB. At step S13, the eNB transmits the PDCCH to the UE. Then, at step S14, the eNB transmits the PDSCH to the UE.

Figure 3A:
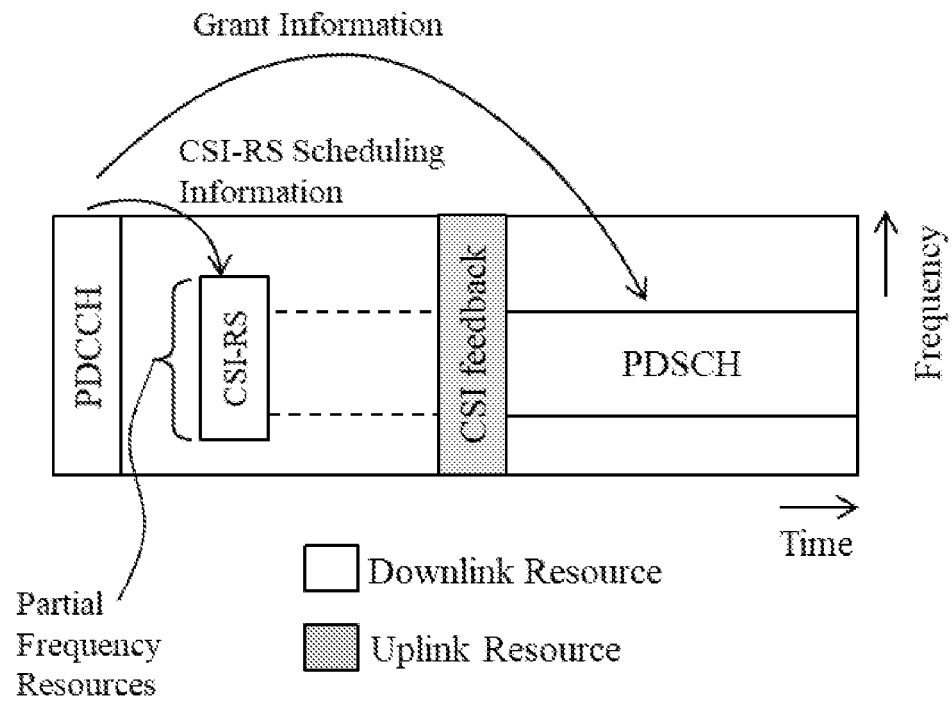
FIGS. 3A and 3B are diagrams showing resource allocation examples in a downlink CSI acquisition scheme according to one or more embodiments of a first example of the present invention.
Figure 3B:
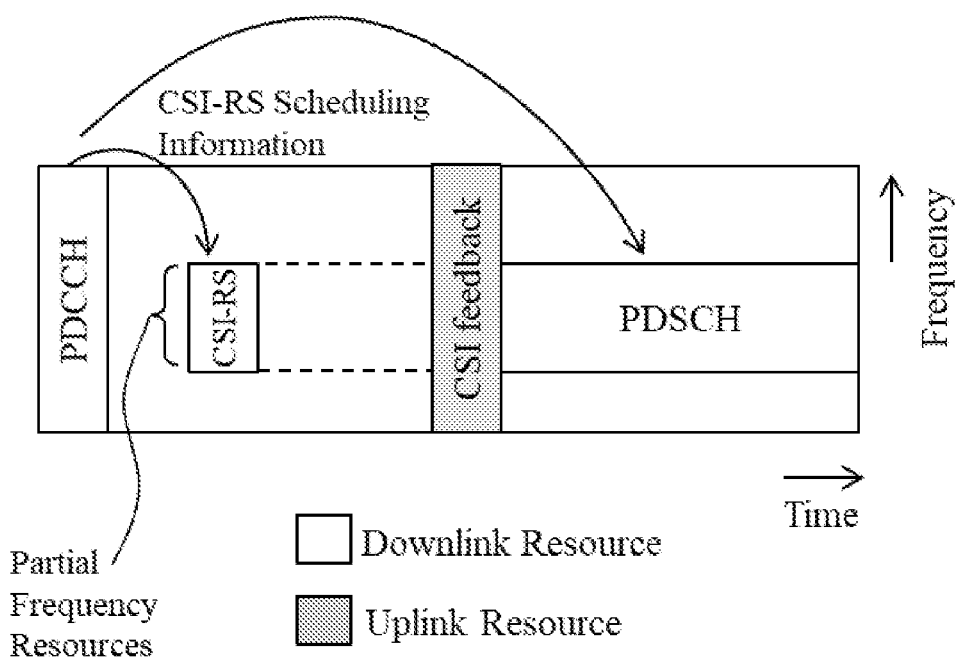

On the other hand, according to one or more embodiments of a first example of the present invention, as shown in FIGS. 3A and 3B, partial frequency resources may be allocated to a CSI-RS in a downlink CSI acquisition scheme. In one or more embodiments of the present invention, the partial frequency resources may be part of all frequency resources. For example, the all frequency resources may be a carrier bandwidth or a system bandwidth. In one or more embodiments of the present invention, the each of the frequency resource may be a resource block in a frequency domain. For example, the number of the partial frequency resources may be one or more.

In an example of FIGS. 3A and 3B, the partial frequency resources allocated to the CSI-RS may be a continuous bandwidth. As another example, the partial frequency resources allocated to the CSI-RS may be a non-contiguous bandwidth. For example, the partial frequency resources may be hopped in a frequency domain.

In one or more embodiments of the first example of the present invention, for example, the partial frequency resources allocated to the CSI-RS may be configured as frequency resources as subband information or group of subbands. For example, the partial frequency resources allocated to the CSI-RS may be configured as frequency resources in a predefined resource allocation unit for PDSCH/Physical Uplink Shared Channel (PUSCH) or group of them. For example, the partial frequency resources allocated to the CSI-RS may be configured as predetermined part of all frequency resources.

According to one or more embodiments of the first example of the present invention, in FIGS. 3A and 3B, CSI-RS scheduling information includes frequency resource information indicating the frequency resources allocated to the CSI-RS (transmission bandwidth of the CSI-RS). For example, the CSI-RS scheduling information may indicate a location of the partial frequency resources allocated to the CSI-RS. For example, the location of the partial frequency resources may be indicated as a starting resource and a length in the frequency domain from the starting resource. The CSI-RS scheduling information may be notified from the gNB 20 to the UE 10. The scheduling information may indicate part or all frequency resources (e.g., carrier bandwidth or system bandwidth). The CSI-RS scheduling information may be part of CSI-RS transmission information. The UE 10 may estimate the CSI using the CSI-RS of which the frequency resources are indicated in the CSI-RS scheduling information, and transmit the CSI feedback based on the estimated CSI. For example, the CSI feedback may be performed for each unit of the frequency resources, e.g., resource allocation unit or group of them. For example, Downlink Control Information (DCI) included in the PDCCH includes the scheduling information. Furthermore, the scheduling information may be notified using the DCI and Radio Resource Control (RRC) signaling and/or Media Access Control Control Element (MAC CE).

For example, in FIG. 3B, the DCI of the PDCCH may indicate frequency resources allocated to both of the CSI-RS and a data channel such as a PDSCH (joint signaling). For example, the DCI of the PDCCH may indicate frequency resources allocated to both of the CSI-RS and a data channel such as a PUSCH (joint signaling), for example, for a system using channel reciprocity for CSI acquisition. That is, as shown in FIG. 3B, the frequency resources allocated to both of the CSI-RS and the PDSCH may be configured to be the same.

According to one or more embodiments of the first example of the present invention, frequency resources allocated to the data channel (PDSCH) may be signaled as a subband or group of multiple subbands. For example, the gNB 20 may determine the frequency resources allocated to the data channel (PDSCH) based on the CSI feedback so that frequency resources are configured as a subband or group of multiple subbands. Then, the gNB 20 may transmit the data channel (PDSCH) using the determined frequency resources signaled as a subband or group of multiple subbands.

Figure 4:
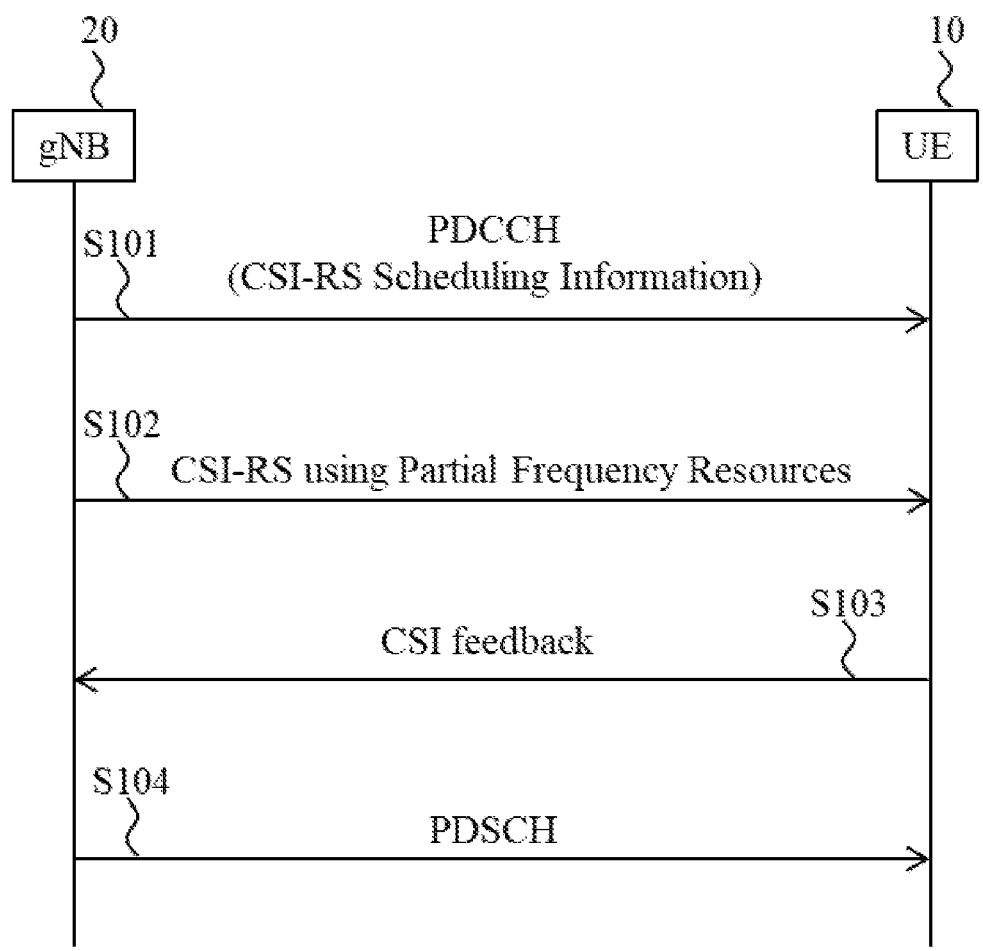
FIG. 4 is a sequence diagram showing an operation example of the downlink CSI acquisition scheme according to one or more embodiments of the first example of the present invention.

FIG. 4 is a sequence diagram showing an operation example of a downlink CSI acquisition scheme according to one or more embodiments of the first example of the present invention.

As shown in FIG. 4, at step S101, the gNB 20 may transmit the PDCCH including the DCI to the UE 10. The DCI may include the CSI-RS scheduling information that indicates the a location of partial frequency resources allocated to the CSI-RS (e.g., transmission bandwidth of the CSI-RS). The location of partial frequency resources may be indicated as an initial RB index in the frequency domain and a bandwidth allocated to the partial frequency resources.

At step S102, the gNB 20 may transmit the CSI-RS using the partial frequency resources to the UE 10.

When the UE 10 receives the CSI-RS using the CSI-RS scheduling information, the UE 10 may perform the CSI calculation based on the received CSI-RS. At step S103, the UE 10 may transmit CSI feedback information based on the calculated CSI. The CSI feedback information includes Rank Indicator (RI), CSI-RS resource indicator (CRI), Precoding Matrix Indicator (PMI), Channel Quality Indicator (CQI), and/or Reference Signal Received Power (RSRP).

At step S104, the gNB 20 may transmit, to the UE 10, the PDSCH precoded using the received PMI.

Thus, according to one or more embodiments of the first example of the present invention, in the downlink CSI acquisition scheme, the CSI-RS can be transmitted using the partial frequency resources. As a result, the efficient channel estimation can be achieved.

First Modified Example

Figure 5:
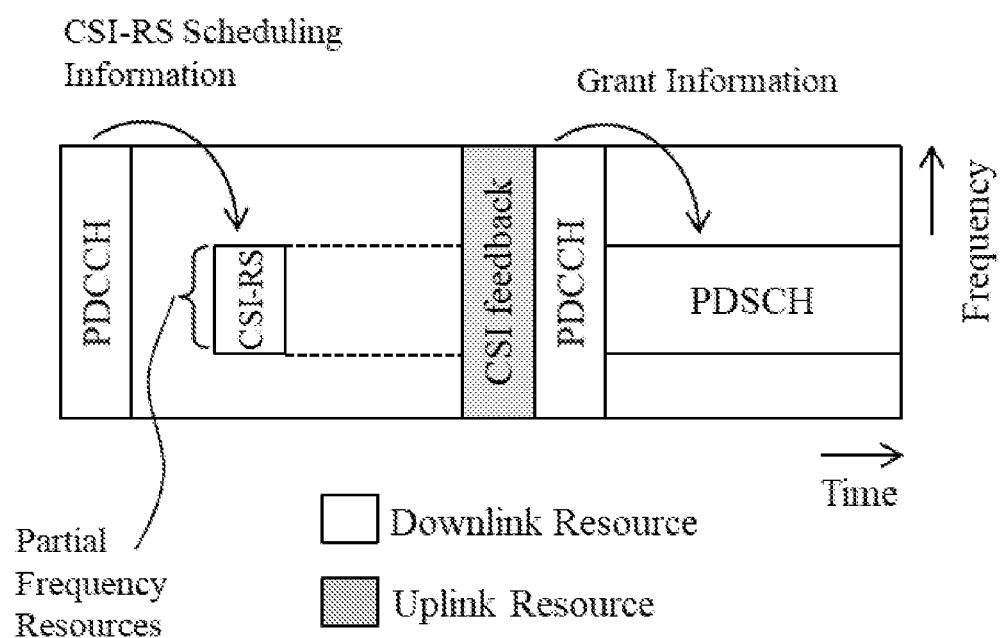
FIG. 5 is a diagram showing a resource allocation example in a downlink CSI acquisition scheme according to one or more embodiments of a first modified example of the present invention.

According to one or more embodiments of a first modified example of the present invention, as shown in FIG. 5, the PDCCH may be transmitted before each of the CSI-RS transmission and the data channel (PDSCH) transmission. For example, a first PDCCH (first DCI) before the CSI-RS transmission may include the CSI-RS transmission information (e.g., CSI-RS scheduling information, quasi-co-location information, etc.). A second PDCCH (second DCI) before the PDSCH transmission may include remaining grant information (e.g., Modulation and Coding Scheme (MCS) information). For example, the first DCI may be associated to both of the CSI-RS and data channel transmission. For example, the second DCI may be associated to data channel transmission.

Figure 6:
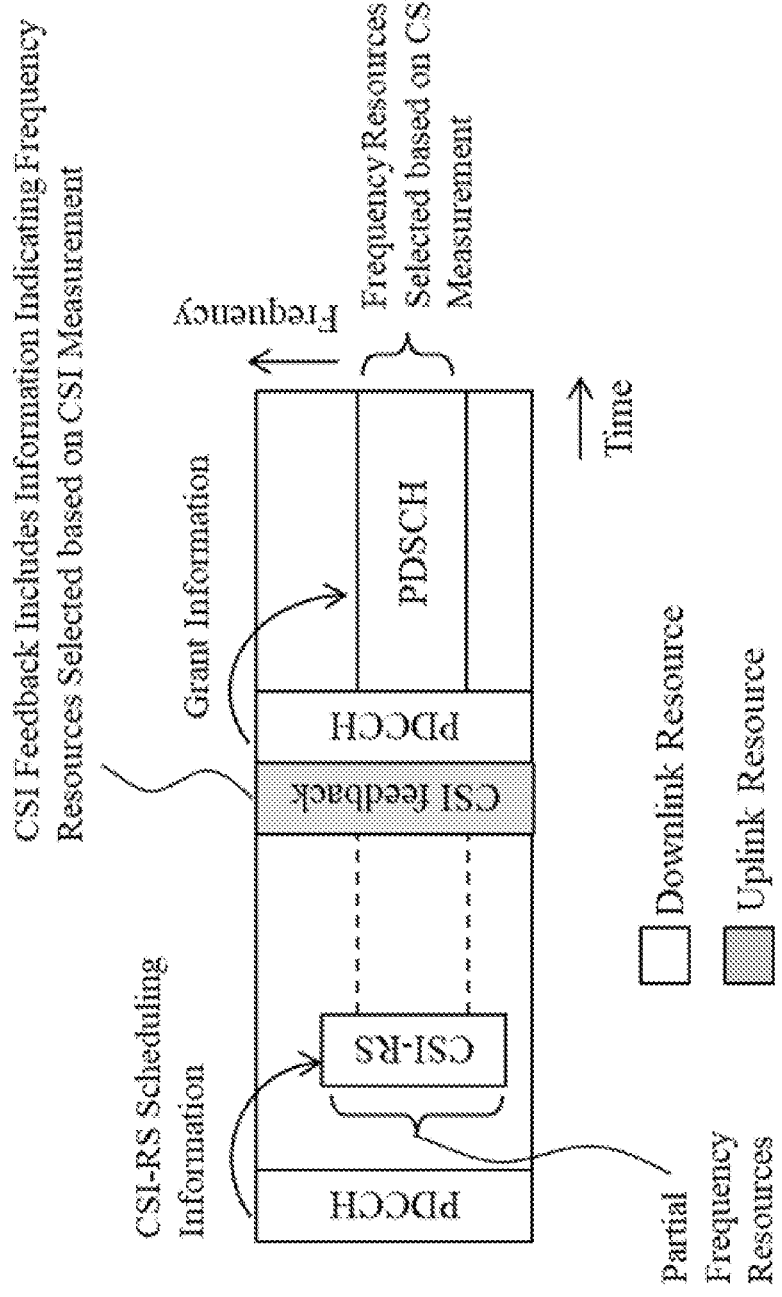
FIG. 6 is a diagram showing a resource allocation method in a downlink CSI acquisition scheme according to one or more embodiments of a first modified example of the present invention.

According to one or more embodiments of a first modified example of the present invention, as shown in FIG. 6, the CSI feedback may include information indicating frequency resources selected based on CSI-RS measurement. That is, the UE 10 may notify the gNB 20 of the frequency resources selected based on CSI-RS measurement based on the CSI-RS transmitted using the partial frequency resources. The frequency resources having best/good characteristics may be selected based on the CSI (e.g., RI and CQI), the RSRP, or another indicator.

Furthermore, according to one or more embodiments of the first modified example of the present invention, as shown in FIG. 6, the frequency resources may be limited using the second PDCCH before the PDSCH transmission. For example, information used to limit the frequency resources taking into account CSI-RS multiplexing resources may be notified.

Figure 7:
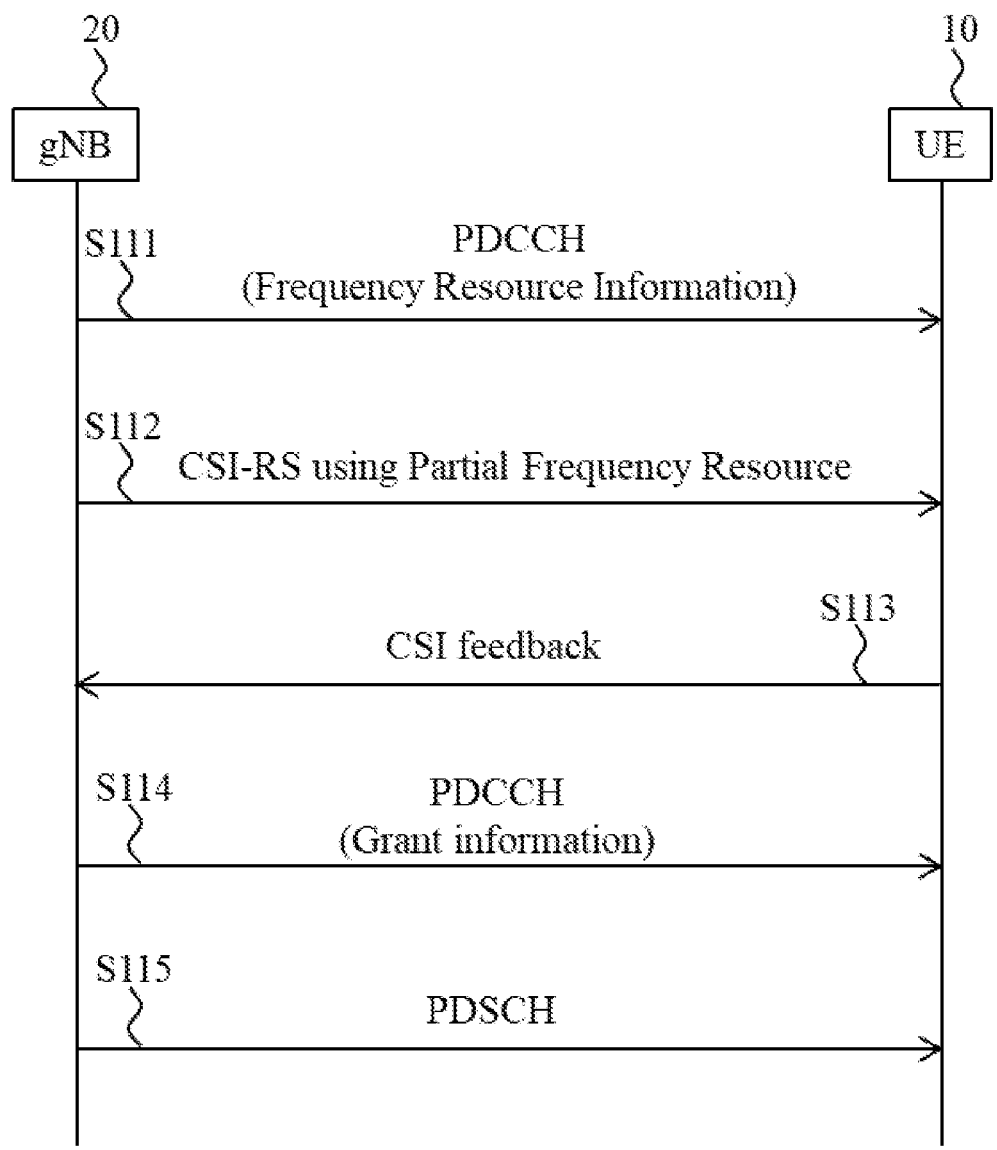
FIG. 7 is a sequence diagram showing an operation example of the CSI acquisition scheme according to one or more embodiments of the first modified example of the present invention.

FIG. 7 is a sequence diagram showing an operation example of a downlink CSI acquisition scheme according to one or more embodiments of the first modified example of the present invention.

As shown in FIG. 7, at step S111, the gNB 20 may transmit the PDCCH including the DCI to the UE 10. The DCI may include the CSI-RS scheduling information that indicates the frequency resources allocated to the CSI-RS.

At step S112, the gNB 20 may transmit the CSI-RS using the partial frequency resources to the UE 10.

When the UE 10 receives the CSI-RS using the CSI-RS scheduling information, the UE 10 may perform the CSI calculation based on the received CSI-RS. At step S113, the UE 10 may transmit CSI feedback information based on the calculated CSI. The CSI feedback information may include information indicating frequency resources having best/good characteristics.

At step S114, the gNB 20 may transmit the PDCCH including the grant information to the UE 10. The DCI may include the CSI-RS scheduling information that indicates the frequency resources allocated to the CSI-RS.

At step S115, the gNB 20 may transmit, to the UE 10, the precoded PDSCH precoded using the frequency resources having best/good characteristics.

According to one or more embodiments of a first modified example of the present invention, frequency resources allocated to the data channel (PDSCH) may be signaled as a subband or group of multiple subbands. For example, the gNB 20 may determine the frequency resources allocated to the data channel (PDSCH) signaled as a subband or group of multiple subbands independently (without the CSI feedback). That is, the determined frequency resources allocated to the PDSCH signaled as a subband or group of multiple subbands may not be associated with a result of the CSI feedback.

Second Example

Figure 8:
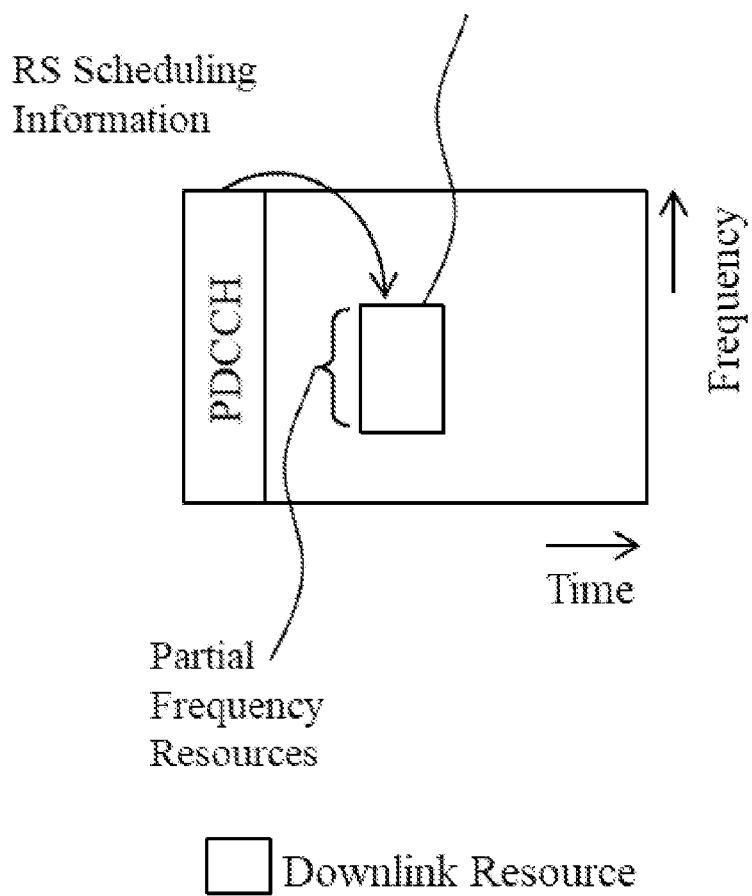
FIG. 8 is a diagram showing a resource allocation example of CSI-Interference Measurement according to one or more embodiments of a second example of the present invention.

According to one or more embodiments of a second example of the present invention, frequency resources used for CSI-Interference Measurement (IM) may be configured to be part of all frequency resources (e.g., carrier bandwidth or system bandwidth). The IM may be referred to as interference estimation. As shown in FIG. 8, one or more partial frequency resources may be allocated to the CSI-IM. For example, the partial frequency resources allocated to the CSI-IM may be contiguous in the frequency domain. For example, the partial frequency resources may be hopped in the frequency domain.

Figure 9:
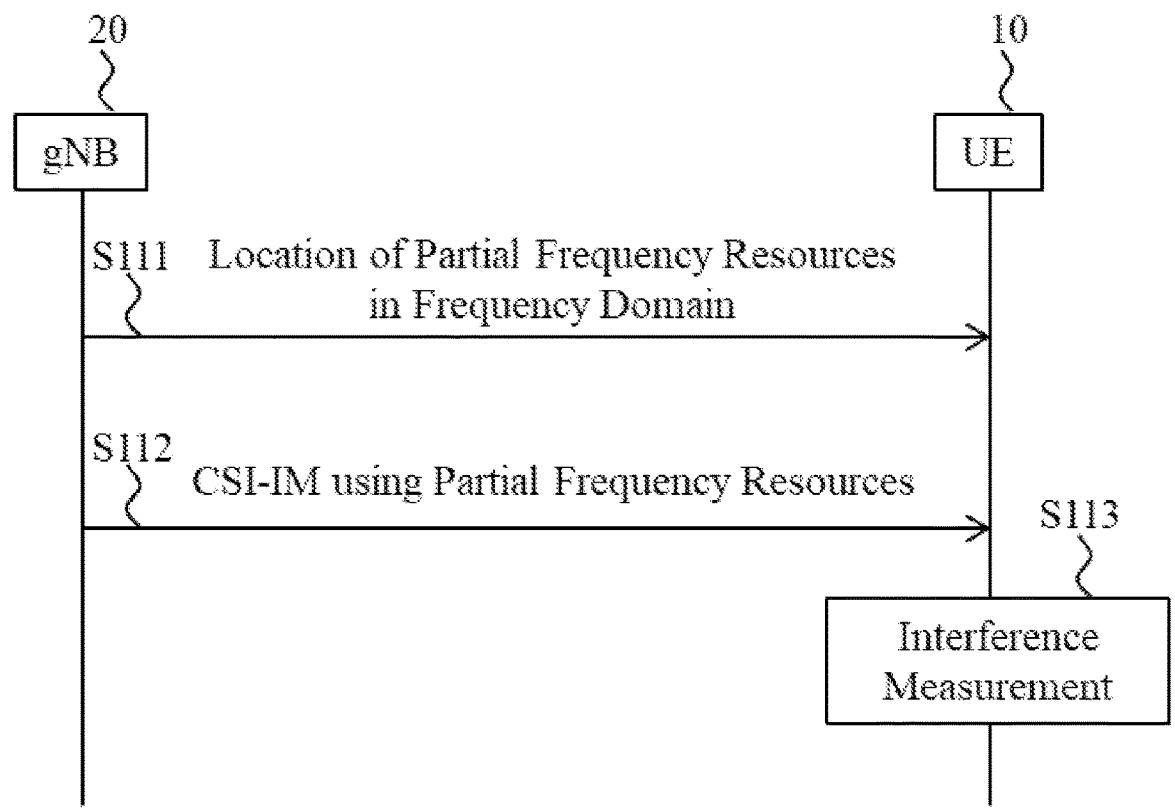
FIG. 9 is a sequence diagram showing an operation example of interference measurement based on the CSI-IM according to one or more embodiments of the second example of the present invention.

FIG. 9 is a sequence diagram showing an operation example of interference measurement based on the CSI-IM according to one or more embodiments of the second example of the present invention.

As shown FIG. 9, at step S111, the gNB 20 may notify the UE 10 of scheduling information that indicates a location of partial frequency resources allocated to the CSI-IM. The scheduling information may be included in the DCI. The location of the partial frequency resources may be indicates as a starting resource and a length in the frequency domain from the starting resource (transmission bandwidth).

At step S112, the gNB 20 may transmit the CSI-IM using the partial frequency resources. The partial frequency resources are located at the notified location at the step S111 in the frequency domain.

At step S113, the UE 10 may perform the interference measurement based on the received CSI-IM.

Furthermore, the reference signal used for the IM may be a Zero Power (ZP) CSI-RS, a Non Zero Power (NZP) CSI-RS, a DM-RS, or another ZP or NZP resource. For example, the partial frequency resources allocated to the CSI-IM may be the same as the partial frequency resources allocated to the CSI-RS used for the channel estimation.

Third Example

Figure 10:
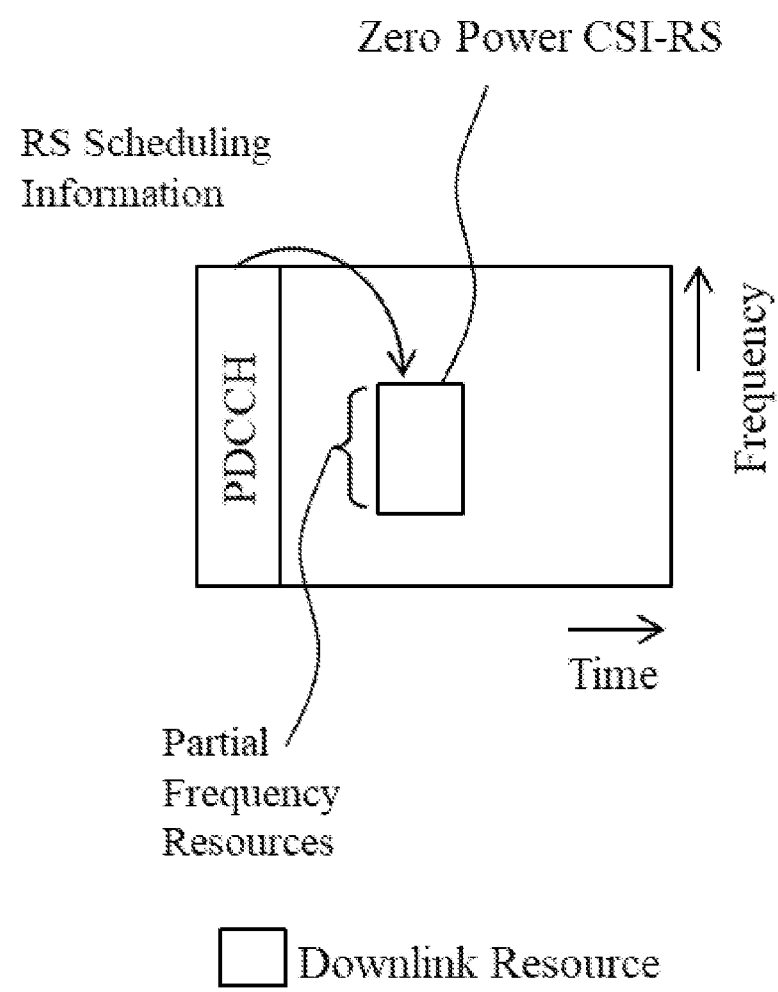
FIG. 10 is a diagram showing a resource allocation example of ZP CSI-RS according to one or more embodiments of a third example of the present invention.

According to one or more embodiments of a third example of the present invention, frequency resources used for ZP CSI-RS may be configured to be part of all frequency resources (e.g., carrier bandwidth or system bandwidth). As shown in FIG. 10, one or more partial frequency resources may be allocated to the ZP CSI-RS. For example, the partial frequency resources allocated to the ZP CSI-RS may be contiguous in the frequency domain. For example, the partial frequency resources may be hopped in the frequency domain.

Figure 11:
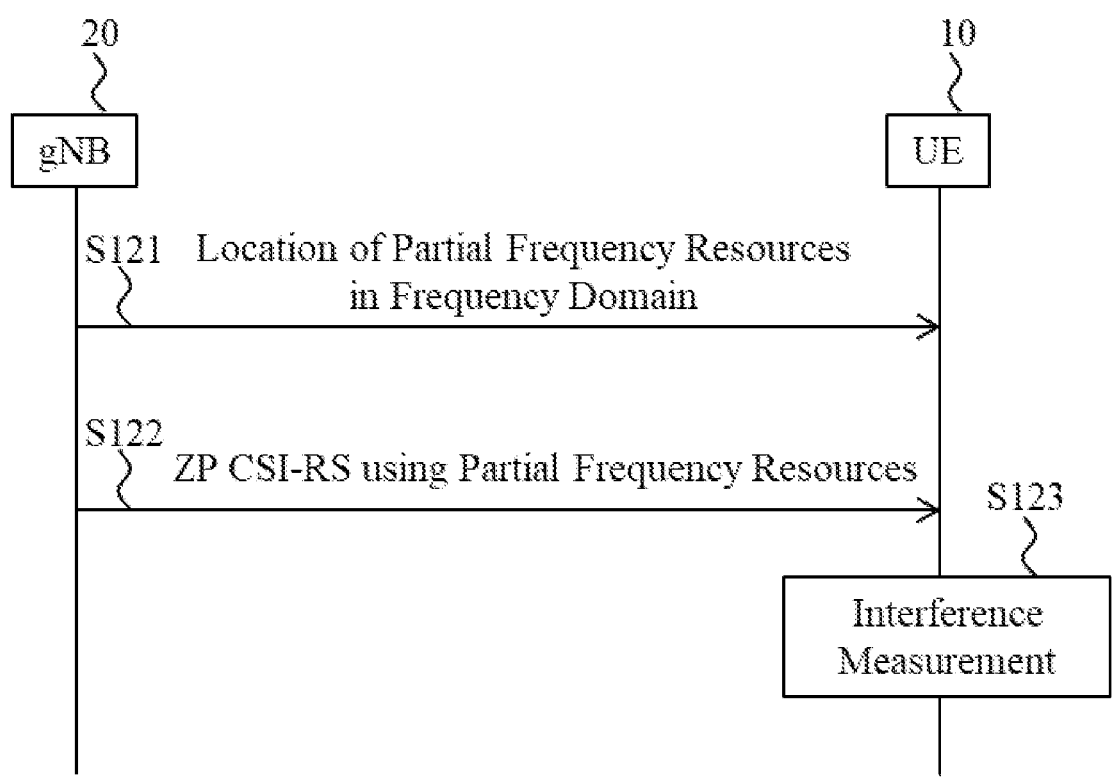
FIG. 11 is a sequence diagram showing an operation example of interference measurement based on the ZP CSI-RS according to one or more embodiments of the third example of the present invention.

FIG. 11 is a sequence diagram showing an operation example of interference measurement based on the ZP CSI-RS according to one or more embodiments of the third example of the present invention.

As shown FIG. 11, at step S121, the gNB 20 may notify the UE 10 of scheduling information that indicates a location of partial frequency resources allocated to the ZP CSI-RS. The scheduling information may be included in the DCI. The location of the partial frequency resources may be indicates as a starting resource and a length in the frequency domain from the starting resource (transmission bandwidth).

At step S122, the gNB 20 may transmit the CSI-IM using the partial frequency resources. The partial frequency resources are located at the notified location at the step S111 in the frequency domain.

At step S123, the UE 10 may perform the interference measurement based on the received ZP CSI-RS.

Fourth Example

The aforementioned technologies applied to the downlink CSI acquisition scheme according to one or more embodiments of the first example of the present invention may be applied to an uplink CSI acquisition scheme. According to one or more embodiments of a fourth example of the present invention, as shown in FIG. 12, partial frequency resources may be allocated to a Sounding Reference Signal (SRS) in the uplink CSI acquisition scheme.

Figure 12:
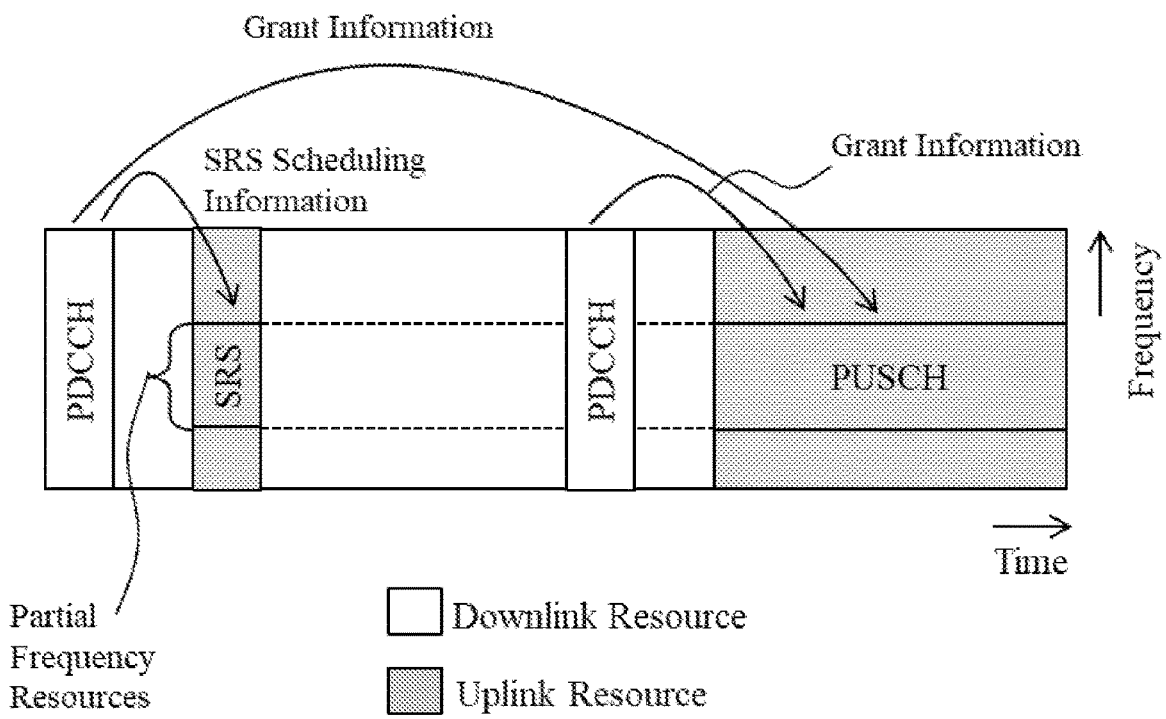
FIG. 12 is a diagram showing a resource allocation method in an uplink CSI acquisition scheme according to one or more embodiments of a fourth example of the present invention.

In an example of FIG. 12, the partial frequency resources allocated to the SRS may be a continuous bandwidth. As another example, the partial frequency resources allocated to the SRS may be a non-contiguous bandwidth. For example, the partial frequency resources may be hopped in a frequency domain.

In one or more embodiments of the fourth example of the present invention, for example, the partial frequency resources allocated to the SRS may be configured as subband or group of them. For example, the partial frequency resources allocated to the SRS may be configured as frequency resources in a resource allocation unit for PDSCH/PUSCH or group of them. For example, the partial frequency resources allocated to the SRS may be configured as predetermined part of all frequency resources.

According to one or more embodiments of the fourth example of the present invention, as shown in FIG. 12, the frequency resources allocated to the SRS (transmission bandwidth of the SRS) may be designated. For example, the DCI of the PDCCH includes SRS scheduling information that designates the frequency resources allocated to the SRS. Furthermore, the frequency resources allocated to the SRS may be designated using the DCI and the RRC signaling and/or the MAC CE.

For example, in FIG. 12, the DCI of the PDCCH may indicate frequency resources allocated to both of the SRS and a data channel such as the PUSCH (joint signaling). For example, the DCI of the PDCCH may indicate frequency resources allocated to both of the SRS and a data channel such as the PDSCH (joint signaling) for example for the system using channel reciprocity for CSI acquisition. That is, as shown in FIG. 12, the frequency resources allocated to both of the SRS and the PUSCH may be configured to be the same.

Figure 13:
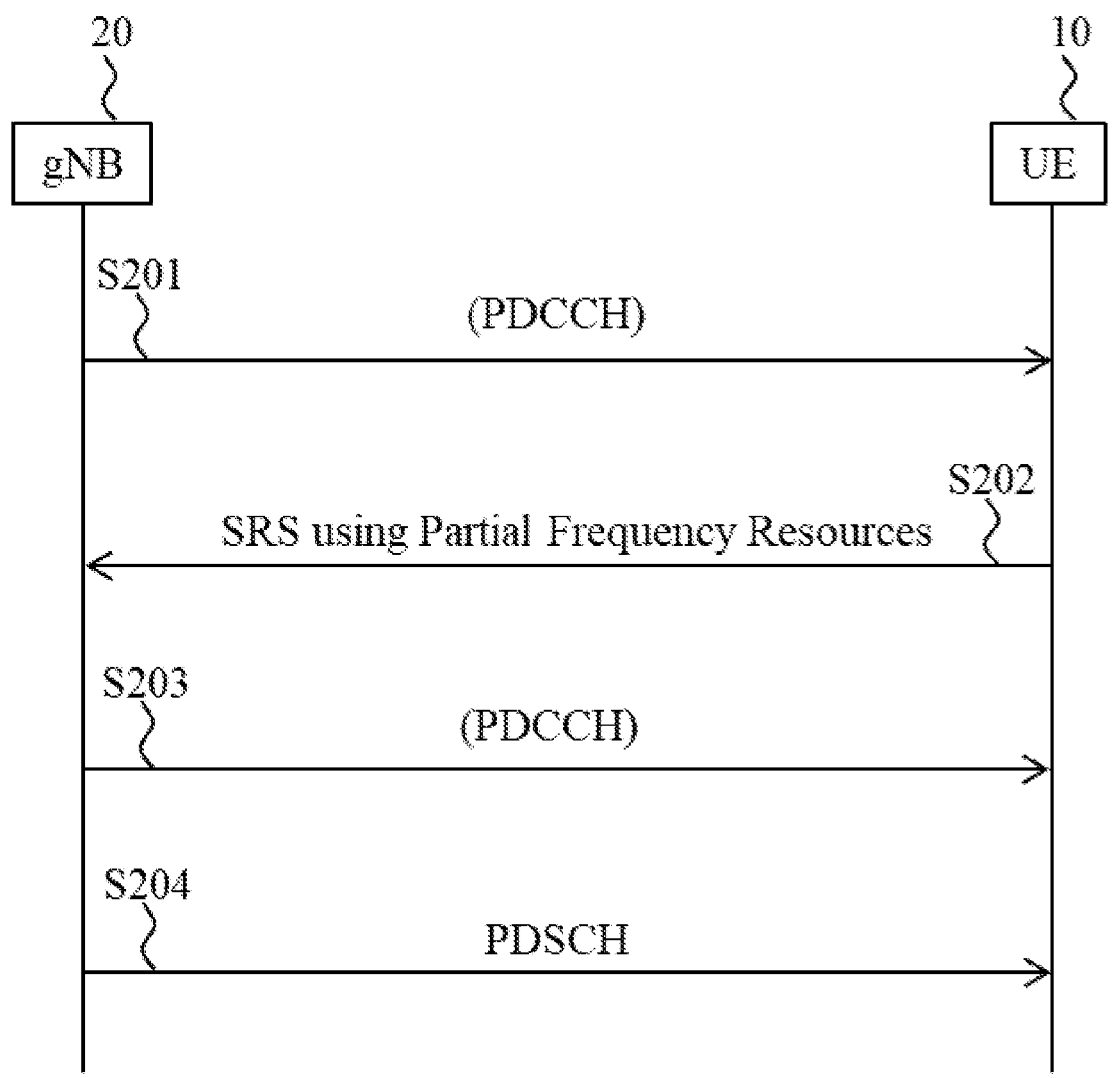
FIG. 13 is a sequence diagram showing an operation example of the uplink CSI acquisition scheme according to one or more embodiments of the fourth example of the present invention.

FIG. 13 is a sequence diagram showing an operation example of an uplink CSI acquisition scheme according to one or more embodiments of the fourth example of the present invention.

As shown in FIG. 13, at step S201, the gNB 20 may transmit the PDCCH including the DCI to the UE 10. The DCI may include the SRS scheduling information that designates the frequency resources allocated to the SRS (transmission bandwidth of the SRS). Furthermore, the PDCCH may not be transmitted at the step S201.

At step S202, the UE 10 may transmit the SRS using the partial frequency resources to the gNB 20. When the UE 10 receives the DCI that designates the frequency resources allocated to the SRS, the partial frequency resources allocated to the SRS is determined based on the frequency resources designated by the DCI.

At step S203, the gNB 20 may transmit the PDCCH to the UE 10.

At step S204, the gNB 20 may transmit the PUSCH to the UE 10.

Thus, according to one or more embodiments of the fourth example of the present invention, in the uplink CSI acquisition scheme, the SRS can be transmitted using the partial frequency resources. As a result, the effective channel estimation can be achieved.

Furthermore, in one or more embodiments of the fourth example of the present invention, interference estimation may be performed by the UE 10 using partial frequency resources. The resource used for interference estimation may be a ZP SRS, a NZP SRS, the DM-RS, or another ZP or NZP resource. Furthermore, RS scheduling information indicating the frequency resources allocated to the RS used for interference estimation may be transmitted from the gNB 20 to the UE 10. For example, the frequency resources allocated to the RS used for the interference estimation and the SRS used for the channel estimation may be the same.

According to one or more embodiments of the fourth example of the present invention, as shown in FIG. 12, the PDCCH may be transmitted before each of the SRS transmission and the data channel (PUSCH) transmission. For example, a first PDCCH before the SRS transmission at the step S201 in FIG. 13 may include the SRS transmission information (e.g., SRS scheduling information etc.). A second PDCCH before the PUSCH transmission at the step S203 in FIG. 13 may include remaining grant information (e.g., MCS information).

Fourth Modified Example

Figure 14:
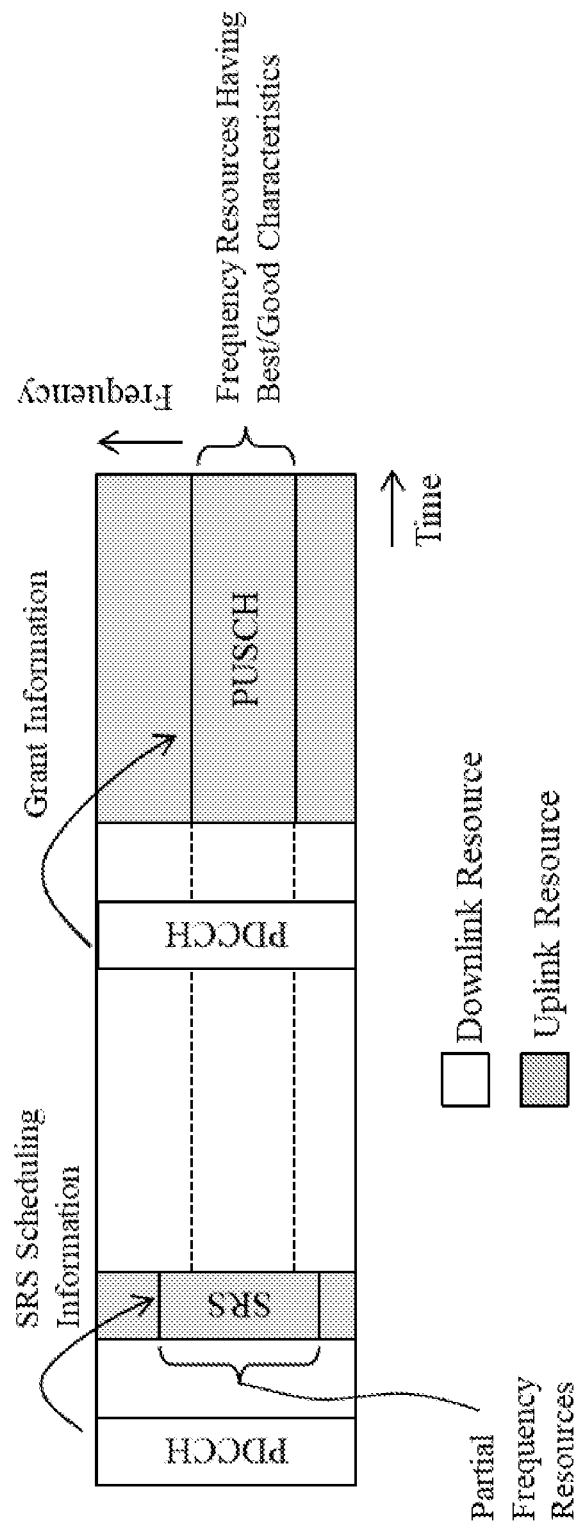
FIG. 14 is a diagram showing a resource allocation method in an uplink CSI acquisition scheme according to one or more embodiments of a fourth modified example of the present invention.

According to one or more embodiments of a fourth modified example of the present invention, as shown in FIG. 14, the PUSCH may be transmitted using a reception result of the SRS. For example, the gNB 20 may detect the frequency resources having best/good characteristics based on the received SRS and transmit the PUSCH using the frequency resources having best/good characteristics to the UE 10.

Furthermore, according to one or more embodiments of the fourth modified example of the present invention, as shown in FIG. 14, the frequency resources may be limited using the second PDCCH before the PUSCH transmission. For example, information used to limit the frequency resources taking into account SRS multiplexing resources may be notified.

Fifth Example

The aforementioned technologies applied to the CSI-RS transmission in the downlink CSI acquisition scheme according to one or more embodiments of the first example of the present invention may be applied to the SRS transmission in the downlink CSI acquisition scheme. According to one or more embodiments of a fifth example of the present invention, as shown in FIG. 15, partial frequency resources may be allocated to the SRS in the downlink CSI acquisition scheme using reciprocity.

Figure 15:
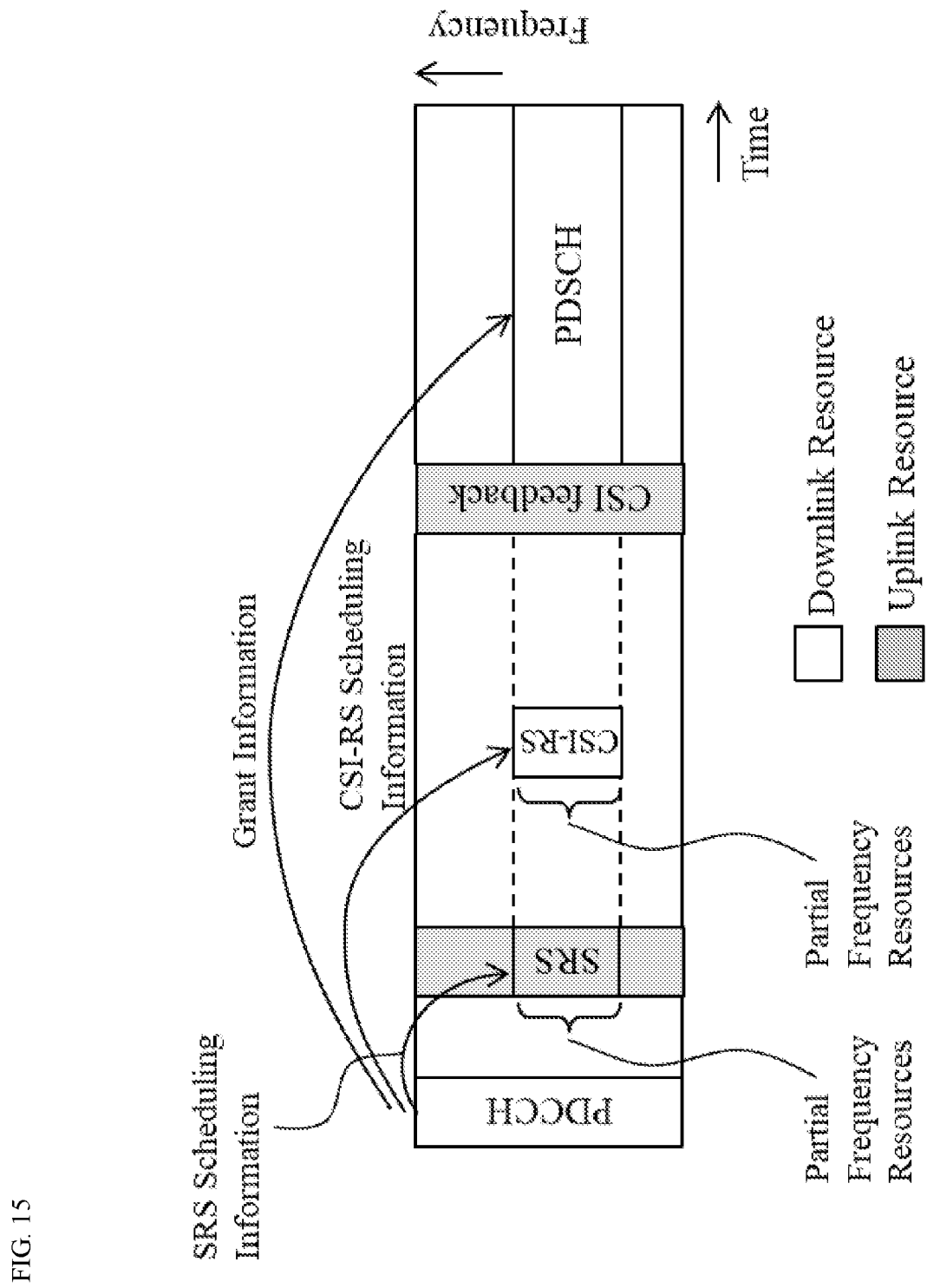
FIG. 15 is a diagram showing a resource allocation method in a downlink CSI acquisition scheme according to one or more embodiments of a fifth example of the present invention.

In an example of FIG. 15, the partial frequency resources allocated to the SRS may be a continuous bandwidth. As another example, the partial frequency resources allocated to the SRS may be a non-contiguous bandwidth. For example, the partial frequency resources may be hopped in a frequency domain.

In one or more embodiments of the fifth example of the present invention, for example, the partial frequency resources allocated to the SRS may be configured as subband or group of them. For example, the partial frequency resources allocated to the SRS may be configured as frequency resources in a resource allocation unit for PDSCH/PUSCH or group of them. For example, the partial frequency resources allocated to the SRS may be configured as predetermined part of all frequency resources.

According to one or more embodiments of the fifth example of the present invention, as shown in FIG. 15, the frequency resources allocated to the SRS (transmission bandwidth of the SRS) may be designated. For example, the DCI of the PDCCH includes SRS scheduling information that designates the frequency resources allocated to the SRS. Furthermore, the frequency resources allocated to the SRS may be designated using the DCI and the RRC signaling and/or the MAC CE.

For example, in FIG. 15, the DCI of the PDCCH may indicate frequency resources allocated to the SRS, the CSI-RS, and a data channel such as the PUSCH (joint signaling). That is, as shown in FIG. 15, the frequency resources allocated to both of the SRS and the PUSCH may be configured to be the same.

Furthermore, in one or more embodiments of the fifth example of the present invention, interference estimation may be performed by the UE 10 using the frequency resources allocated to the SRS designated by the DCI.

Figure 16:
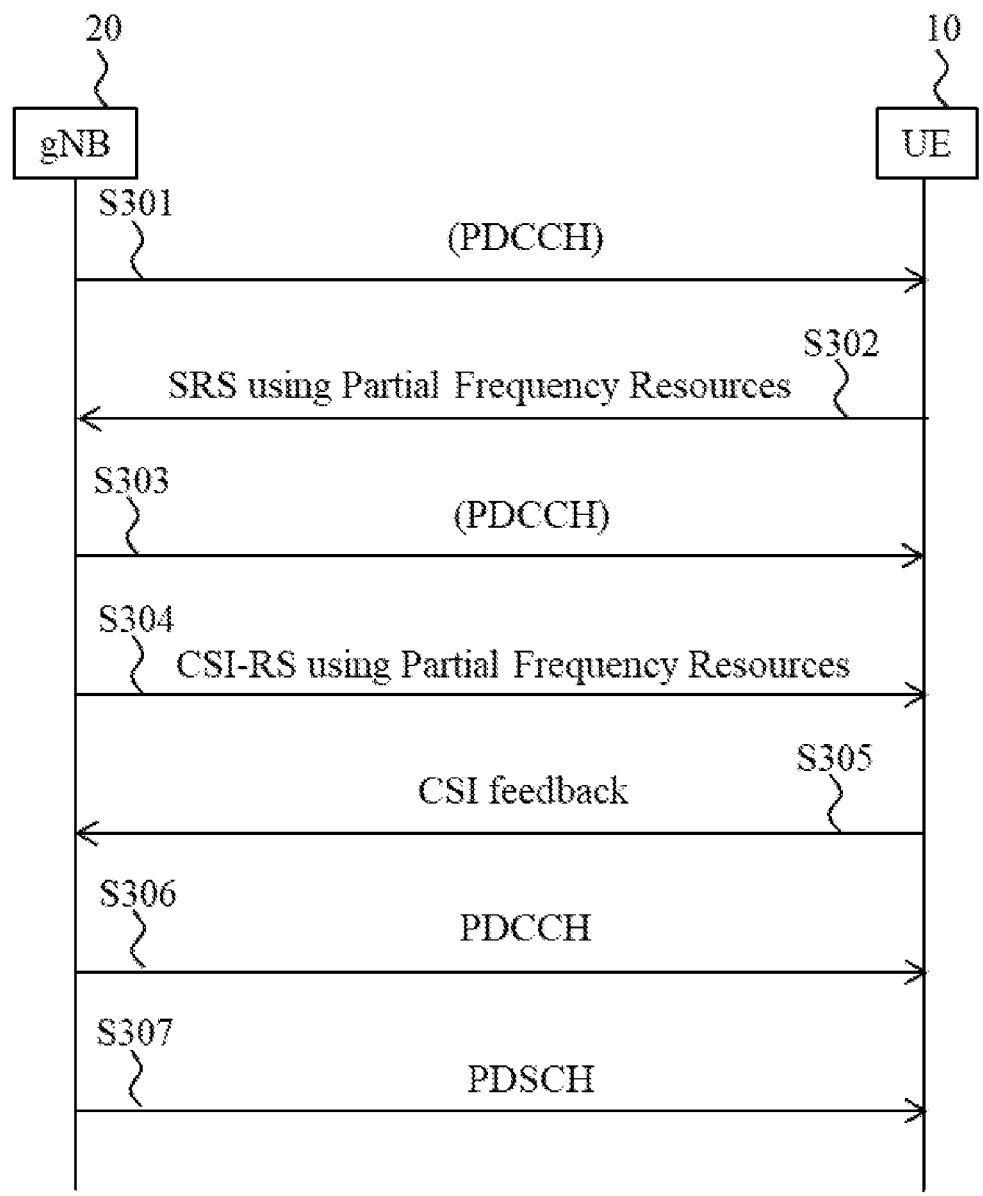
FIG. 16 is a sequence diagram showing an operation example of the downlink CSI acquisition scheme according to one or more embodiments of the fifth example of the present invention.

FIG. 16 is a sequence diagram showing an operation example of an uplink CSI acquisition scheme according to one or more embodiments of the fifth example of the present invention.

As shown in FIG. 16, at step S301, the gNB 20 may transmit the PDCCH including the DCI to the UE 10. The DCI may include the SRS scheduling information that designates the frequency resources allocated to the SRS (transmission bandwidth of the SRS). Furthermore, the DCI may include the CSI-RS scheduling information. Furthermore, the PDCCH may not be transmitted at the step S301.

At step S302, the UE 10 may transmit the SRS using the partial frequency resources to the gNB 20. When the UE 10 receives the DCI that designates the frequency resources allocated to the SRS, the partial frequency resources allocated to the SRS is determined based on the frequency resources designated by the DCI.

At step S303, the gNB 20 may transmit the PDCCH to the UE 10. Furthermore, the PDCCH may not be transmitted at the step S303.

At step S304, the gNB 20 may transmit the CSI-RS using the partial frequency resources to the UE 10.

When the UE 10 receives the CSI-RS using the CSI-RS scheduling information, the UE 10 may perform the CSI calculation based on the received CSI-RS. At step S305, the UE 10 may transmit CSI feedback information based on the calculated CSI.

At step S306, the gNB 20 may transmit the PDCCH to the UE 10.

At step S307, the gNB 20 may transmit the PDSCH to the UE 10.

Thus, according to one or more embodiments of the fifth example of the present invention, in the downlink CSI acquisition scheme, the SRS can be transmitted using the partial frequency resources. As a result, the effective channel estimation can be achieved.

Fifth Modified Example

Figure 17:
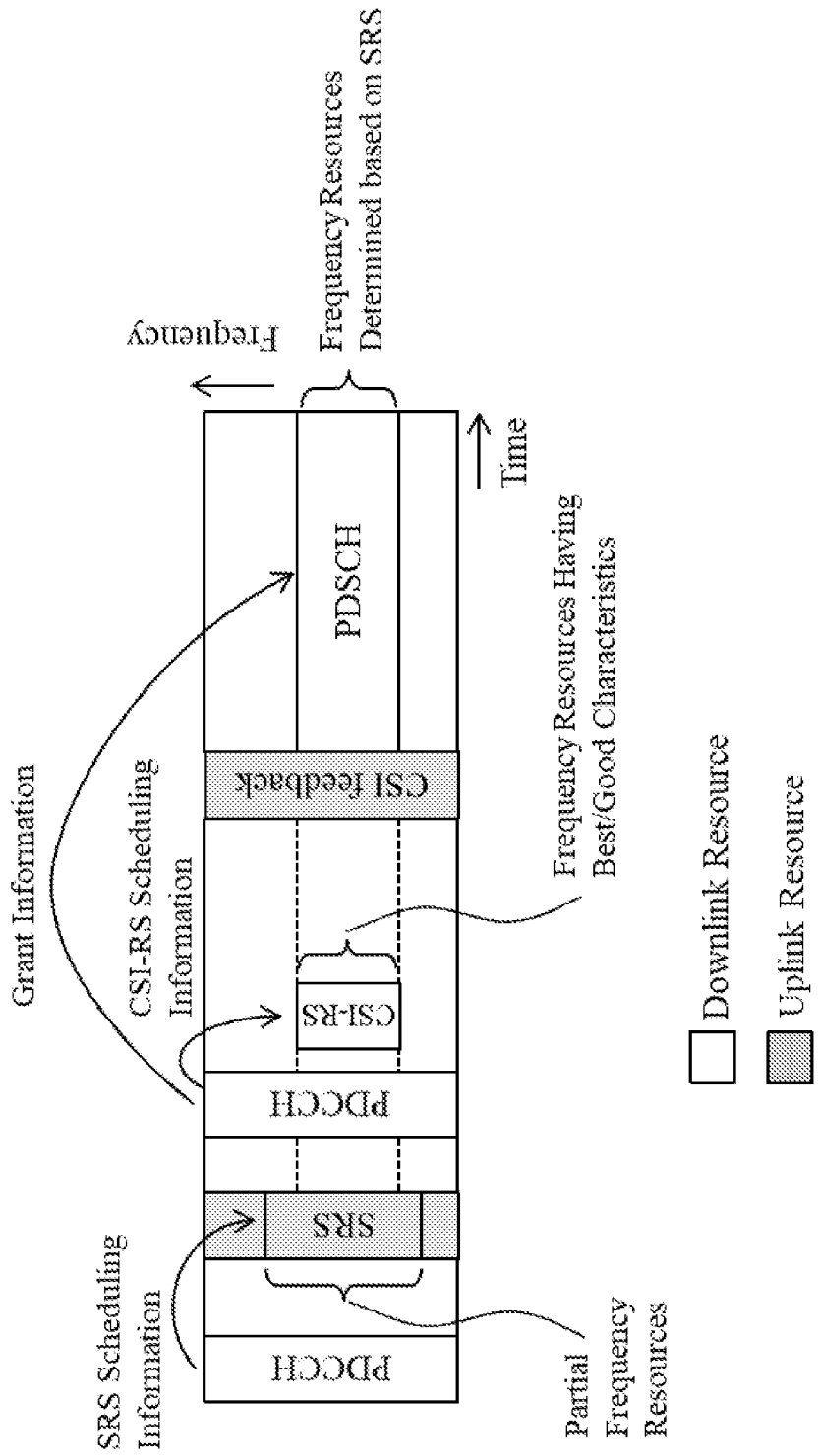
FIG. 17 is a diagram showing a resource allocation method in a downlink CSI acquisition scheme according to one or more embodiments of a fifth modified example of the present invention.

According to one or more embodiments of a fifth modified example of the present invention, as shown in FIG. 17, the multiple PDCCHs may be applied to the SRS transmission, the CSI-RS transmission, and the data channel (PDSCH) transmission. For example, a first PDCCH before the SRS transmission at the step S301 in FIG. 16 may include the SRS transmission information (e.g., SRS scheduling information etc.). A second PDCCH before the CSI-RS transmission and the PUSCH transmission at the step S303 in FIG. 16 may include grant information (e.g., scheduling information of the CSI-RS and data channel (PDSCH) and/or MCS information).

According to one or more embodiments of the fifth modified example of the present invention, as shown in FIG. 17, the CSI-RS and the PUSCH may be transmitted using a reception result of the SRS. For example, the gNB 20 may determine the frequency resources (e.g., frequency resources having best/good characteristics) based on the received SRS and transmit the CSI-RS and the PUSCH using the frequency resources having best/good characteristics to the UE 10.

Furthermore, according to one or more embodiments of the fifth modified example of the present invention, as shown in FIG. 17, the frequency resources may be limited using the second PDCCH before the CSI-RS and the PDSCH transmission. For example, information used to limit the frequency resources taking into account SRS multiplexing resources may be notified. The frequency resources allocated to the CSI-RS and the PDSCH may be limited using the second PDCCH.

Sixth Example

The aforementioned technologies applied to the downlink CSI acquisition scheme according to one or more embodiments of the first example of the present invention may be applied to the uplink CSI acquisition scheme. According to one or more embodiments of a sixth example of the present invention, as shown in FIG. 18, partial frequency resources may be allocated to the CSI-RS in the uplink CSI acquisition scheme using reciprocity.

Figure 18:
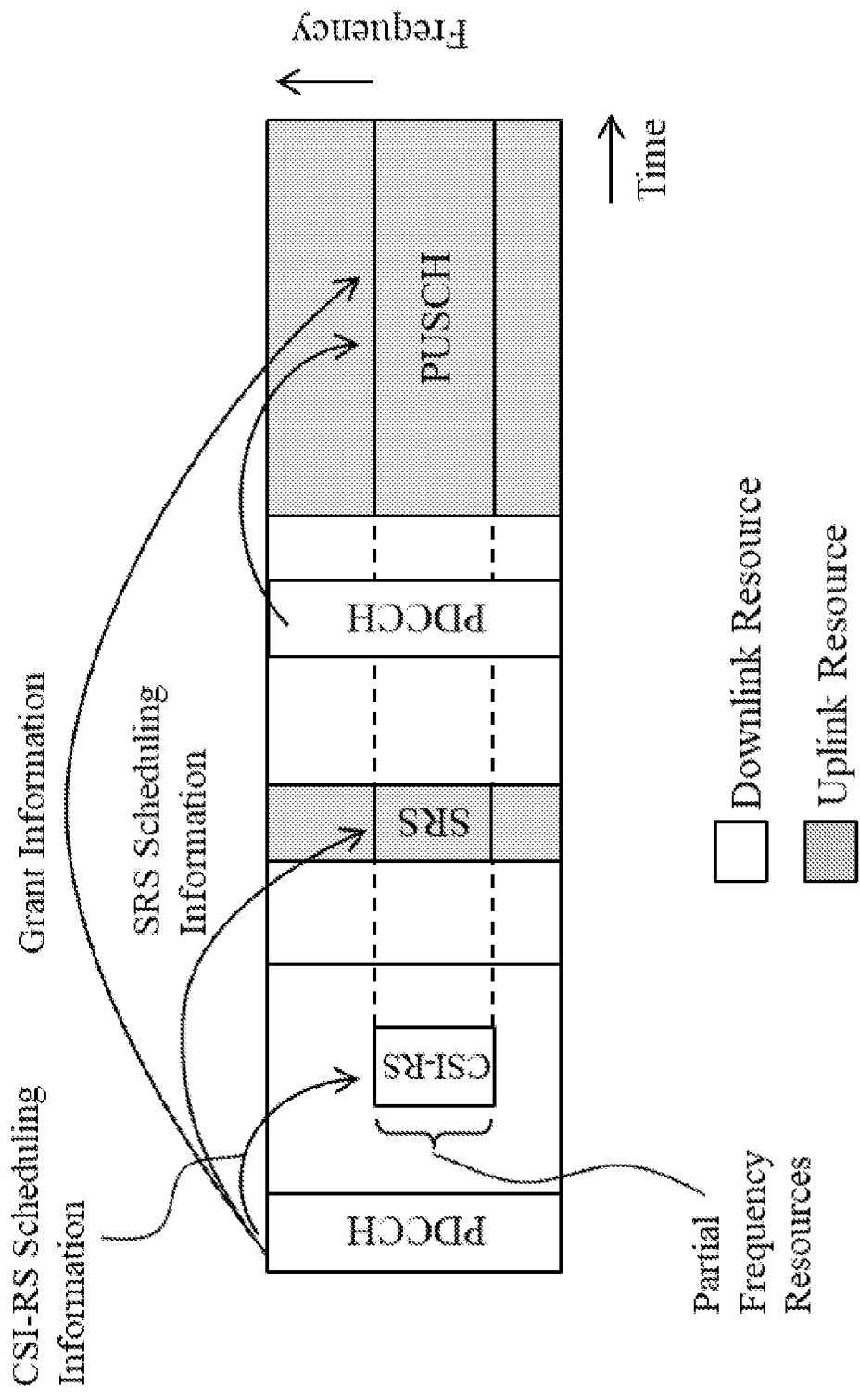
FIG. 18 is a diagram showing a resource allocation method in an uplink CSI acquisition scheme according to one or more embodiments of a sixth example of the present invention.

In an example of FIG. 18, the partial frequency resources allocated to the CSI-RS may be a continuous bandwidth. As another example, the partial frequency resources allocated to the CSI-RS may be a non-contiguous bandwidth. For example, the partial frequency resources may be hopped in a frequency domain.

In one or more embodiments of the sixth example of the present invention, for example, the partial frequency resources allocated to the CSI-RS may be configured as subband or group of them. For example, the partial frequency resources allocated to the CSI-RS may be configured as frequency resources in a resource allocation unit for the PDSCH/PUSCH or group of them. For example, the partial frequency resources allocated to the CSI-RS may be configured as predetermined part of all frequency resources.

According to one or more embodiments of the sixth example of the present invention, as shown in FIG. 18, CSI-RS scheduling information indicating the frequency resources allocated to the CSI-RS (transmission bandwidth of the CSI-RS) may be notified from the gNB 20 to the UE 10. The CSI-RS scheduling information may be part of CSI-RS transmission information. The UE 10 may estimate the CSI using the CSI-RS of which the frequency resources are indicated in the CSI-RS scheduling information, and transmit the CSI feedback based on the estimated CSI. For example, the DCI included in the PDCCH includes the scheduling information. Furthermore, the scheduling information may be notified using the DCI and the RRC signaling and/or the MAC CE.

For example, in FIG. 18, the DCI of the PDCCH may indicate frequency resources allocated to the CSI-RS and at least one of the SRS and the data channel (joint signaling). That is, as shown in FIG. 18, the frequency resources allocated to both of the CSI-RS and the PDSCH may be configured to be the same.

Furthermore, in one or more embodiments of the sixth example of the present invention, interference estimation may be performed by the UE 10 using the frequency resources allocated to the CSI-RS designated by the DCI.

Furthermore, in one or more embodiments of the sixth example of the present invention, the UE 10 may apply precoding to the SRS based on a reception result of the CSI-RS. Furthermore, information indicating whether the SRS should be precoded may be signaled.

According to one or more embodiments of the fifth example of the present invention, as shown in FIG. 18, the multiple PDCCHs may be applied to the CSI-RS transmission, the SRS transmission, and the data channel (PDSCH) transmission. For example, a first PDCCH before the CSI-RS transmission may include the CSI-RS transmission information (e.g., CSI-RS scheduling information, quasi-co-location information etc.). A second PDCCH before the PUSCH transmission may include grant information (e.g., scheduling information of the data channel (PDSCH) and/or MCS information).

Figure 19:
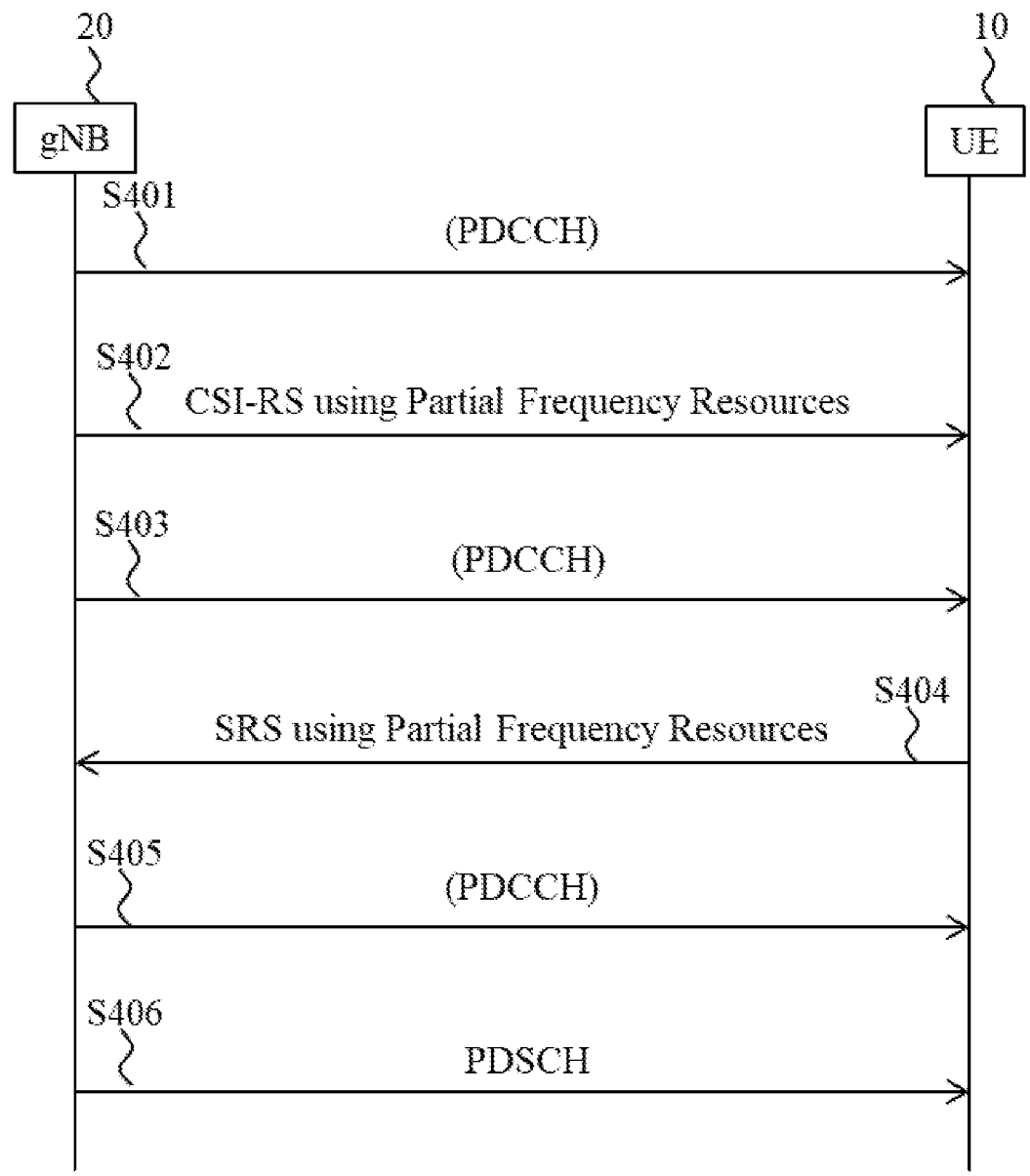
FIG. 19 is a sequence diagram showing an operation example of the uplink CSI acquisition scheme according to one or more embodiments of the sixth example of the present invention.

FIG. 19 is a sequence diagram showing an operation example of the uplink CSI acquisition scheme according to one or more embodiments of the sixth example of the present invention.

As shown in FIG. 19, at step S401, the gNB 20 may transmit the PDCCH including the DCI to the UE 10. The DCI may include the CSI-RS scheduling information that indicates the frequency resources allocated to the CSI-RS (transmission bandwidth of the CSI-RS). Furthermore, the DCI may include the SRS scheduling information. Furthermore, the PDCCH may not be transmitted at the step S401.

At step S402, the gNB 20 may transmit the CSI-RS using the partial frequency resources to the UE 10.

At step S403, the gNB 20 may transmit the PDCCH to the UE 10. Furthermore, the PDCCH may not be transmitted at the step S403.

At step S404, the UE 10 may transmit the SRS using the partial frequency resources to the gNB 20.

At step S406, the gNB 20 may transmit the PDCCH to the UE 10.

At step S407, the gNB 20 may transmit the PDSCH to the UE 10.

Thus, according to one or more embodiments of the first example of the present invention, in the uplink CSI acquisition scheme, the CSI-RS can be transmitted using the partial frequency resources. As a result, the effective channel estimation can be achieved.

Sixth Modified Example

Figure 20:
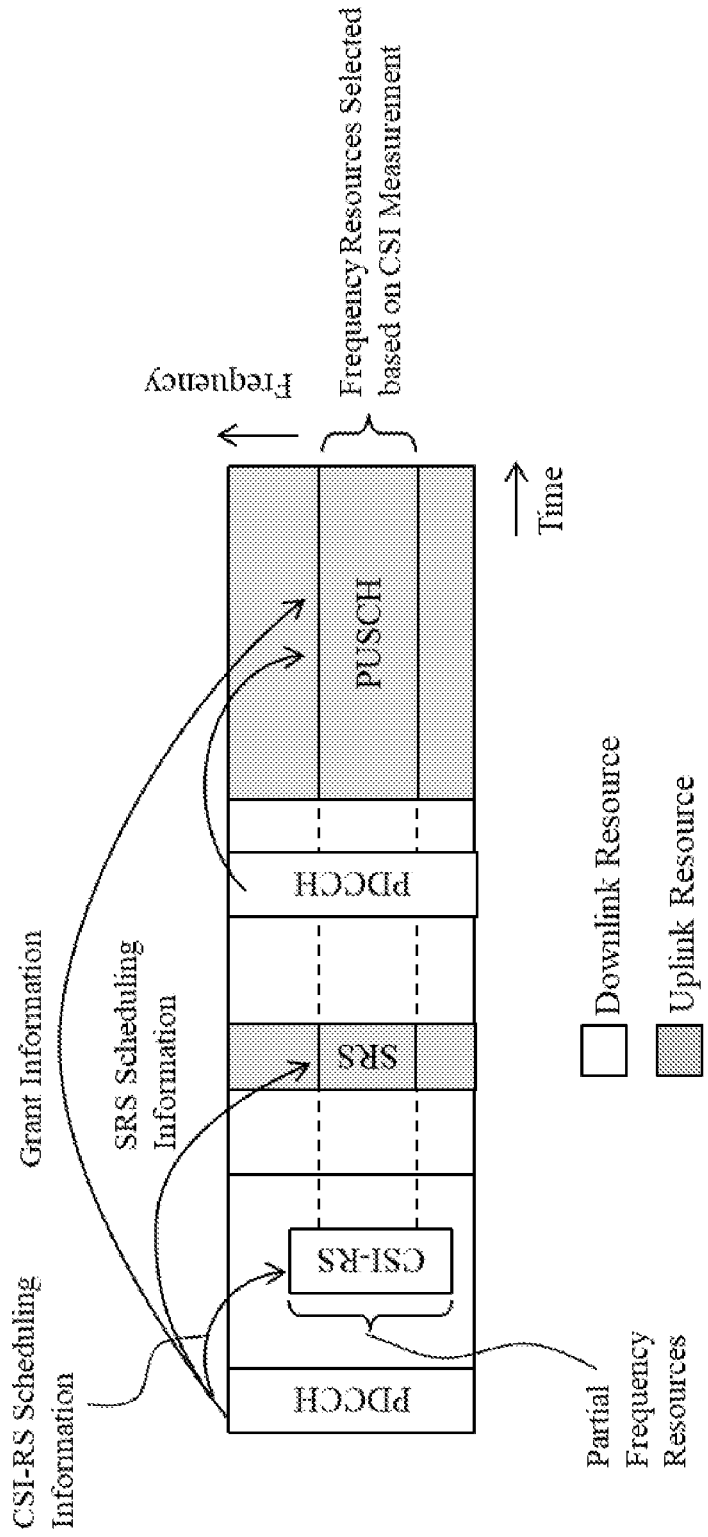
FIG. 20 is a diagram showing a resource allocation method in an uplink CSI acquisition scheme according to one or more embodiments of a sixth modified example of the present invention.

According to one or more embodiments of a sixth modified example of the present invention, as shown in FIG. 20, the SRS and the PUSCH may be transmitted using a reception result of the CSI-RS. For example, the UE 10 may detect the frequency resources selected based on the CSI measurement (e.g., frequency resources having best/good characteristics) using the received CSI-RS and transmit the detected frequency resources having best/good characteristics as feedback to the gNB 20. For example, the UE 10 may transmit the SRS using the frequency resources having best/good characteristics to the gNB 20.

Furthermore, according to one or more embodiments of the sixth modified example of the present invention, as shown in FIG. 20, the frequency resources may be limited using the second PDCCH before the PUSCH transmission. For example, information used to limit the frequency resources taking into account SRS multiplexing resources may be notified. The frequency resources allocated to the SRS and the PUSCH may be limited using the second PDCCH.

Seventh Example

According to one or more embodiments of a seventh example of the present invention, to achieve the more efficient channel estimation, multiplexing density of the channel measurement resource and/or the interference estimation resource may be changed in accordance with the bandwidth of the resource (e.g., the number of Resource Blocks (RBs) allocated to the resource). For example, the multiplexing density of the resource per RB may be increased or decreased. For example, the multiplexing density of the resource may be changed in accordance with the total number of the frequency resources allocated to the resource. As another example, the multiplexing density of the resource may be changed in accordance with the number of the continuous frequency bandwidth.

In one or more embodiments of the seventh example of the present invention, the gNB 20 may notify the UE 10 of the multiplexing density using at least one of the RRC signaling, the MAC CE, and the DCI.

Another Example

In one or more embodiments of the above first to seventh examples, step-by-step CSI acquisition methods are proposed. For example, in one or more embodiments of the present invention, positional relation in a time-domain of the physical signals and channels may be defined.

For example, when the multiple PDCCHs are used, relative positional relation of the multiple PDCCHs may be defined in the specification (standard). For example, relative positional relation of the multiple PDCCHs may be notified from the gNB 20 to the UE 10 using at least one of the RRC signaling, the MAC CE, and the DCI.

For example, an index that associates the multiple PDCCHs with each other may be notified from the gNB 20 to the UE 10. For example, a unique index may associate the multiple PDCCHs with each other.

For example, the definition and the notification of the relative positional relation may be applied to combinations of other signals and channels. The combinations may be:

a combination of the PDCCH transmission and the SRS transmission;

a combination of the PDCCH transmission, the SRS transmission, and the CSI-RS transmission;

a combination of the SRS transmission and the CSI-RS transmission;

a combination of the PDCCH transmission, the CSI-RS transmission, and the SRS transmission; and a combination of the CSI-RS transmission and the SRS transmission.

According to one or more embodiments of another example of the present invention, frequency resources allocated to the data channel such as a PUSCH may be signaled as a subband or group of multiple subbands. For example, the gNB 20 may determine the frequency resources allocated to the PUSCH based on the SRS so that frequency resources are signaled as a subband or group of multiple subbands. Then, the gNB 20 may transmit the PUSCH using the determined frequency resources configured as a subband or group of multiple subbands.

Furthermore, the gNB 20 may determine the frequency resources allocated to the PDSCH signaled as a subband or group of multiple subbands independently (SRS). That is, the determined frequency resources allocated to the PDSCH signaled as a subband or group of multiple subbands may not be associated with the received SRS.

(Configuration of gNB)

Figure 21:
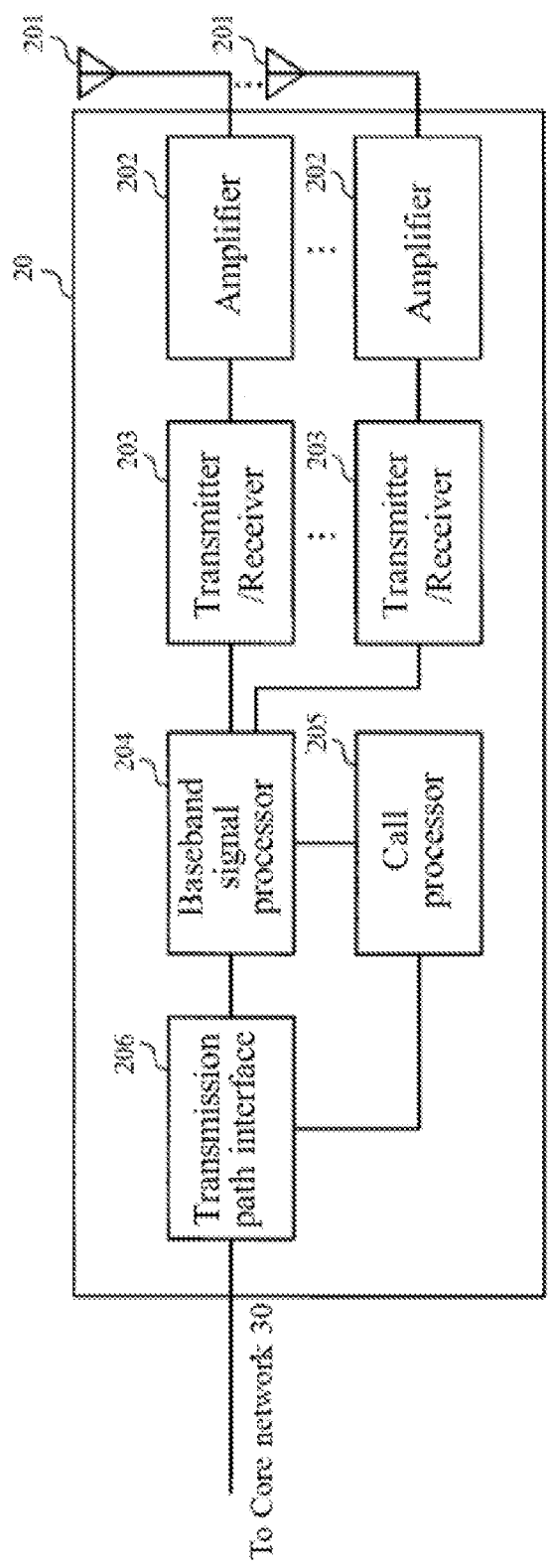
FIG. 21 is a diagram showing a schematic configuration of the gNB according to one or more embodiments of the present invention.

The gNB 20 according to one or more embodiments of the present invention will be described below with reference to FIG. 21. FIG. 21 is a diagram illustrating a schematic configuration of the gNB 20 according to one or more embodiments of the present invention. The gNB 20 may include a plurality of antennas (antenna element group) 201, amplifier 202, transceiver (transmitter/receiver) 203, a baseband signal processor 204, a call processor 205 and a transmission path interface 206.

User data that is transmitted on the DL from the gNB 20 to the UE 20 is input from the core network 30, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control, including, for example, HARQ transmission processing, scheduling, transport format selection, channel coding, inverse fast Fourier transform (IFFT) processing, and precoding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information (system information) for communication in the cell by higher layer signaling (e.g., RRC signaling and broadcast channel). Information for communication in the cell includes, for example, UL or DL system bandwidth.

In each transceiver 203, baseband signals that are precoded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201.

As for data to be transmitted on the UL from the UE 10 to the gNB 20, radio frequency signals are received in each antennas 201, amplified in the amplifier 202, subjected to frequency conversion and converted into baseband signals in the transceiver 203, and are input to the baseband signal processor 204.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network 30 through the transmission path interface 206. The call processor 205 performs call processing such as setting up and releasing a communication channel, manages the state of the gNB 20, and manages the radio resources.

(Configuration of User Equipment)

Figure 22:
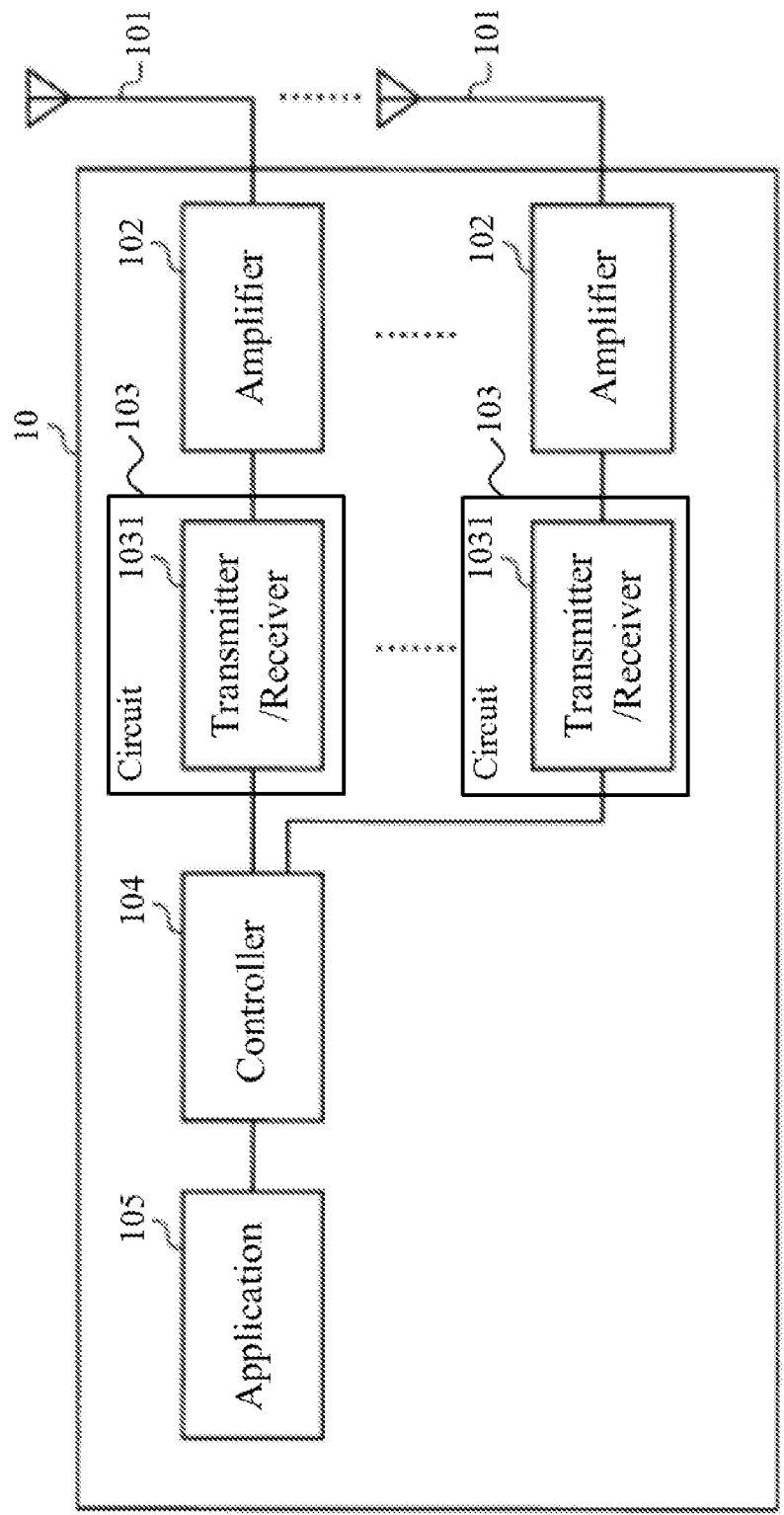
FIG. 22 is a diagram showing a schematic configuration of the UE according to one or more embodiments of the present invention.

The UE 10 according to one or more embodiments of the present invention will be described below with reference to FIG. 22. FIG. 22 is a schematic configuration of the UE 10 according to one or more embodiments of the present invention. The UE 10 has a plurality of UE antennas 101, amplifiers 102, the circuit 103 comprising transceiver (transmitter/receiver) 1031, the controller 104, and an application 105.

As for DL, radio frequency signals received in the UE antennas 101 are amplified in the respective amplifiers 102, and subjected to frequency conversion into baseband signals in the transceiver 1031. These baseband signals are subjected to reception processing such as FFT processing, error correction decoding and retransmission control and so on, in the controller 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the controller 104. In the controller 104, retransmission control (Hybrid ARQ) transmission processing, channel coding, precoding, DFT processing, IFFT processing and so on are performed, and the resultant signals are transferred to each transceiver 1031. In the transceiver 1031, the baseband signals output from the controller 104 are converted into a radio frequency band. After that, the frequency-converted radio frequency signals are amplified in the amplifier 102, and then, transmitted from the antenna 101.

One or more embodiments of the present invention may be used for each of the uplink and the downlink independently. One or more embodiments of the present invention may be also used for both of the uplink and the downlink in common.

Although the present disclosure mainly described examples of a channel and signaling scheme based on NR, the present invention is not limited thereto. One or more embodiments of the present invention may apply to another channel and signaling scheme having the same functions as NR such as LTE/LTE-A and a newly defined channel and signaling scheme.

Although the present disclosure mainly described examples of technologies related to channel estimation and CSI feedback schemes based on the CSI-RS, the present invention is not limited thereto. One or more embodiments of the present invention may apply to another synchronization signal, reference signal, and physical channel such as Primary Synchronization Signal/Secondary Synchronization Signal (PSS/SSS) and DM-RS.

Although the present disclosure mainly described examples of technologies related to uplink channel estimation based on the SRS, the present invention is not limited thereto. Sounding Reference Signal (SRS). One or more embodiments of the present invention may apply to another uplink reference signals and physical channels such as DM-RS.

Although the present disclosure described examples of various signaling methods, the signaling according to one or more embodiments of the present invention may be explicitly or implicitly performed.

Although the present disclosure mainly described examples of various signaling methods, the signaling according to one or more embodiments of the present invention may be the higher layer signaling such as the RRC signaling and/or the lower layer signaling such as the DCI and the MAC CE. Furthermore, the signaling according to one or more embodiments of the present invention may use a Master Information Block (MIB) and/or a System Information Block (SIB). For example, at least two of the RRC, the DCI, and the MAC CE may be used in combination as the signaling according to one or more embodiments of the present invention.

One or more embodiments of the present invention may be applied to CSI acquisition, channel sounding, beam management, and other beam control schemes.

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A user equipment (UE) comprising:
  a receiver that receives, by higher layer signaling, information indicating a resource for interference measurement; and
  a processor that performs interference measurement based on the information,
  wherein the resource for the interference measurement is allocated to one or more frequency resources within a carrier bandwidth part, wherein the resource for the interference measurement is allocated contiguously in a frequency domain within the carrier bandwidth part, wherein a location of the resource for the interference measurement allocated within the carrier bandwidth part is indicated, based on the information received by the higher layer signaling, as a starting resource and a length of a frequency domain from the starting resource, and wherein the processor determines, based on the information received by the higher layer signaling, the location of the resource for the interference measurement allocated within the carrier bandwidth part, the starting resource of the resource for the interference measurement and the length of the resource for the interference measurement.

2. The UE according to claim 1, wherein the resource for the interference measurement is allocated, based on the information, contiguously in a frequency domain within the carrier bandwidth part.

3. A radio communication method for a user equipment (UE), the radio communication method comprising:

receiving, by higher layer signaling, information indicating a resource for interference measurement; and performing interference measurement based on the information, wherein the resource for the interference measurement is allocated to one or more frequency resources within a carrier bandwidth part, wherein the resource for the interference measurement is allocated contiguously in a frequency domain within the carrier bandwidth part, wherein a location of the resource for the interference measurement allocated within the carrier bandwidth part is indicated, based on the information received by the higher layer signaling, as a starting resource and a length of a frequency domain from the starting resource, and determining, based on the information received by the higher layer signaling, the location of the resource for the interference measurement allocated within the carrier bandwidth part, the starting resource of the resource for the interference measurement and the length of the resource for the interference measurement.

4. A base station (BS) comprising:

a transmitter that transmits, by higher layer signaling, information indicating a resource for interference measurement, the information being used to perform interference measurement in a user equipment (UE); and a processor that indicates to perform the interference measurement in the UE based on the information, wherein the resource for the interference measurement is allocated to one or more frequency resources within a carrier bandwidth part, wherein the resource for the interference measurement is allocated contiguously in a frequency domain within the carrier bandwidth part, and wherein the processor indicates a location of the resource for the interference measurement allocated within the carrier bandwidth part, by the information transmitted by the higher layer signaling, as a starting resource and a length of a frequency domain from the starting resource, and indicates to perform the interference measurement in the UE based on the location of the resource for the interference measurement allocated within the carrier bandwidth part, the starting resource of the resource for the interference measurement and the length of the resource for the interference measurement.

5. A system comprising a user equipment (UE) and a base station (BS), wherein:

the UE comprises:
a receiver that receives, by higher layer signaling, information indicating a resource for interference measurement;
a first processor that performs interference measurement based on the information, and
wherein the first processor determines, based on the information received by the higher layer signaling, a location of the resource for the interference measurement allocated within a carrier bandwidth part, a starting resource of the resource for the interference measurement and a length of a frequency domain from the starting resource of the resource for the interference measurement,
and the BS comprises:
a transmitter that transmits the information; and
a second processor that indicates to perform the interference measurement in the UE based on the information, wherein the resource for the interference measurement is allocated to one or more frequency resources within the carrier bandwidth part, wherein the resource for the interference measurement is allocated contiguously in a frequency domain within the carrier bandwidth part, wherein the location of the resource for the interference measurement allocated within the carrier bandwidth part is indicated, based on the information received by the higher layer signaling, as the starting resource and the length of the frequency domain from the starting resource, and wherein the second processor indicates to perform the interference measurement in the UE based on the location of the resource for the interference measurement allocated within the carrier bandwidth part, the starting resource of the resource for the interference measurement and the length of the resource for the interference measurement.

* * * * *